United States Patent [19]

Harrison et al.

[11] Patent Number: 5,506,708
[45] Date of Patent: Apr. 9, 1996

[54] SUBSTITUTED PHTHALOCYANINES

[75] Inventors: Kenneth J. Harrison, Colwall; Michael J. Cook; Andrew J. Thomson, both of Norwich, all of England; Neil B. McKeown, Crieff, Scotland; Mervyn F. Daniel, Chester; Adrian J. Dunn, Amersham, both of England

[73] Assignee: The Secretary of State for Defence in Her Majesty's Government of the United Kingdom of Great Britain and Northern Ireland, London, England

[21] Appl. No.: 380,437

[22] Filed: Jul. 17, 1989

[30] Foreign Application Priority Data

Feb. 13, 1987 [GB] United Kingdom ............... 8703396
Dec. 30, 1987 [GB] United Kingdom ............... 8730290

[51] Int. Cl.⁶ .................... C09B 47/04; C09K 19/34; G03C 1/00
[52] U.S. Cl. .................... 359/103; 540/139; 540/140; 540/122; 540/135; 430/495; 430/270.21; 252/582
[58] Field of Search .................... 540/130, 140, 540/122; 252/299.61; 350/350 R; 430/20; 359/103

[56] References Cited

U.S. PATENT DOCUMENTS

| | | | |
|---|---|---|---|
| 4,592,980 | 6/1986 | Tomida et al. | 430/57 |
| 4,814,256 | 5/1989 | Aldag et al. | 540/122 |
| 5,024,926 | 6/1991 | Itoh et al. | 540/140 |

FOREIGN PATENT DOCUMENTS

| | | |
|---|---|---|
| 0180930 | 5/1986 | European Pat. Off. |
| 61-109056 | of 0000 | Japan . |
| 61-152689 | 7/1986 | Japan . |
| 1181867 | 8/1986 | Japan .................... 540/130 |
| 61-223056 | of 1986 | WIPO . |

OTHER PUBLICATIONS

Cooper Spectroscopic Techniques for Organic Chemists (Wiley and Sons, New York 1980) pp. 234–237.
Chemical Abstracts 1977–1981 Chemical Substance Index R. 39957CS.
Chemical Abstracts 1972–1976 Chemical Substance Index, p. 29231 CS.
Chemical Abstracts 1982 to 1986 Chemical Substance Index p. 30733CS.
Snow et al, Thin Solid Films 1985, 133 197–201.
Chem. Abstracts, vol. 105, 1986, Abstract 121321a.
Delella, et al. Thin Solid Films 1985 (133) 207–17.
Chem. Abstracts vol. 105, 1986. Abstract 121322.
Kalina, et al, Thin Solid Films 1985, 133, 109–19.
Chem. Abstracts, vol. 105, 1986. Abstract 121323.
Hann et al, Thin Solid Films 1985 35–42.
Chem. Abstracts vol. 105, 1986, 134 Abstract 121456.
Snow et al., JACS, 1984 106 4706–4711.

Primary Examiner—Nicholas Rizzo
Assistant Examiner—P. K. Sripada
Attorney, Agent, or Firm—Nixon & Vanderhye

[57] ABSTRACT

Phthalocyanine of formula (I), wherein M is a metal or is 2H, bonded at 29 and 31 positions shown, $R_1$ to $R_8$ are the same or different and are independently selected from $C_1$ to $C_{20}$ alkyl, $C_1-C_{20}$ alkenyl, $-X-COO-X^1$, $-X-O-Y$, a, and $-X-COZ$ where X is independently selected from a chemical bond, $(CH_2)_n$ where n–0–20 or $(CH_2)_a$ CH—CH $(CH_2)_b$, where a and b are independently selected from 0–20 and a+b is in the range 0–20, $X^1$ is independently selected from $C_1-C_{20}$ alkyl or $C_2-C_{20}$ alkenyl, Y is independently selected from $C_1-C_{20}$ alkyl, $C_2-C_{20}$ alkenyl or H and Z is selected from OH or $NR^1R^{11}$ are independently selected from H, $C_1-C_{20}$ alkyl and $C_2-C_{20}$ alkenyl. These phthalocyanines may exhibit discotic liquid crystal phases, absorb infra-red radiation and make good Langmuir-Blodgett films.

23 Claims, 13 Drawing Sheets

(7) M = H,H;
a  R = Me
b  R = Et
c  R = n-Pr
d  R = n-Bu
e  R = n-Pe
f  R = n-Hex
g  R = n-Hep
h  R = n-Oct
i  R = n-Non
j  R = n-Dec
k  R = n-Dodec
l  R = 4-Pentenyl
m  R = 3-Phenylpropyl (8) M = Cu;
a  R = n-Pr
b  R = n-Bu
c  R = n-Pe
d  R = n-Oct
e  R = 4-Pentenyl (9) M = Zn; R = n-Pe

(10) M = Ni; R = n-Pe

(11)  a  R = Me
      b  R = Et
      c  R = n-Pr
      d  R = n-Bu
      e  R = n-Pe
      f  R = n-Hex
      g  R = n-Hep
      h  R = n-Oct
      i  R = n-Non
      j  R = n-Dec
      k  R = n-Dodec
      l  R = 4-Pentenyl
      m  R = 3-Phenylpropyl

(12)  R = H

SUBSTITUTED PHTHALOCYANINES

This application is a continuing application under 35 USC 363 of International Application No. PCT/GB88/00089, filed on 12 Feb. 1988.

The present invention relates to certain novel substituted phthalocyanines, to methods for their preparation and to certain uses thereof.

In recent years several materials have been proposed for laser addressed applications in which laser beams are used to scan across the surface of the material to leave a written impression thereon. For various reasons, many of these materials have consisted of organic materials which are at least partially transparent in the visible region. The technique relies upon localised absorption of laser energy which causes localised heating and in turn alters the optical properties of the otherwise transparent material in the region of contact with the laser beam. Thus as the beam traverses the material, a written impression of its path is left behind. The most important of these applications is currently in laser addressed optical storage devices, and in laser addressed projection displays in which light is directed through a cell containing the material and is projected onto a screen. Such devices have been described by F J Khan (Appl Phys Lett Vol 22, p 111, 1973) and by Harold and Steele (Proceedings of Euro Display 84, pp. 29–31, Sep. 1984, Paris, France) in which the material in the device was a smectic liquid crystal material. Devices which use a liquid crystal material as the optical storage medium are an important class of such devices.

The use of semiconductor lasers, especially $Ga_xAl_{1-x}As$ lasers (where x if from 0 to 1 and is prefereably 1), has proven particularly popular in the above applications because they can provide laser energy at a range of wavelengths in the near infra-red which cannot be seen (and thus cannot interfere with the visible display), and yet can provide a useful source of well-defined, intense heat energy. Gallium arsenide lasers provide laser light at a wavelength of about 850 nm, and are most useful for the above applications. With increasing Al content ($x<1$), laser wavelength may be reduced down to about 750 nm.

One of the main problems associated with the use of the above materials is that it has hitherto proved difficult to provide materials which are transparent in the visible region and yet are strong absorbers in either the uv or ir region (preferably in the near ir region). The use of dyes within these materials can provide strong absorption at certain wavelengths, but few dyes are transparent in the visible region and many are insoluable in the type of materials used for laser addressed applications.

EP-A-0155780 discloses a group of metal and metal-free phthalocyanines which have been used as infra-red absorbing dyes for a number of applications. These phthalocyanines contain from 5 to 16 peripheral organic suhstituent groups that are linked to the phthalocyanine through sulphur, selenium, tellurium, or nitrogen atoms. However, very few of the group disclosed absorb infra-red radiation strongly at or near the wavelength of a gallium arsenide laser (850 nm). This problem also applies to a further group of infra-red absorbing . phthalocyanines disclosed in EP-A-0134518. This further group consists of naphthalocyanines which are peripherally substituted with alkyl groups and centrally substituted with a metal atom or a chloride, bromide or oxide thereof.

Materials Science II/1–2, 1976 pp. 39–45 discloses the synthesis of octamethoxyphthalocyanines but these are insoluable in organic solvents and as such are unsuitable for acting as dyes in liquid crystalline solvents for laser addressed systems.

It is one object of the present invention to provide a noval group of phthalocyanines in which the above problems are overcome or at least mitigated in part. More specifically, it is a further object of the present invention to provide a novel group of phthalocyanines at least some of which, in thin films for example Langmuir-Blodgett films, in the liquid crystalline state, or when dissolved or dispersed in a carrier material are strong absorbers of infra-red radiation within the range 750 nm and 870 nm and preferably exhibit absorption maxima ($\lambda_{max}$) within that range.

According to a first aspect of the present invention there is provided a phthalocyanine (hereinafter abbreviated "Pc") of general formula I

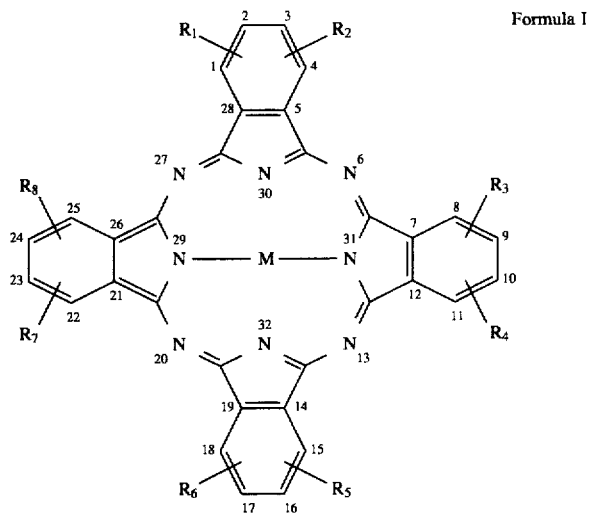

Formula I

Wherein M is a metal atom or is 2H, one H being bonded to each of the bonding N atoms (29 and 31 positions) shown. $R_1$ to $R_8$ are the same or different and are independently selected from $C_1$ to $C_{20}$ alkyl, $C_1$–$C_{20}$ alkenyl, —X—COO—$X^1$, —X—O—Y,

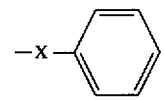

and —X—COZ where X is independently selected from a chemical bond –$(CH_2)_n$ where n=0–20 or –$(CH_2)_a$CH=CH–$(CH_2)_b$– where a and b are independently selected from 0–20 and a+b is in the range 0–20, $X^1$ is independently selected from $C_1$–$C_{20}$ alkyl or $C_2$–$C_{20}$ alkenyl, Y is independently selected from $C_1$–$C_{20}$ alkyl, $C_2$–$C_{20}$ alkenyl or H and Z is selected from OH or $NR^1R^{11}$ where $R^1$ and $R^{11}$ are independently selected from H, $C_1$–$C_{20}$ alkyl and $C_2$–$C_{20}$ alkenyl, provided that where Y is alkyl and X is a chemical bond at least one of the groups $R_1$–$R_8$ is selected from —X—COO—$X^1$ and —X—COZ and further provided that if $R_1$–$R_8$ all contain more than 6 carbon atoms and are all selected from alkyl or —X—O—Y where X is —$(CH_2)_n$– and Y is alkyl then $R_1$–$R_8$ are not all in the 2, 3, 9, 10, 16, 17, 23, and 24 positions indicated in formula I.

The high stability of the Pc ring system suggests many possible uses for compounds of formula I especially when complexed with central metal ions M the variable oxidation states of which may give rise to materials with semiconductor, photoconductor or electrochromic properties. Such properties may be exploited in sensors, catalysts and displays.

Further possible uses of Pc of formula I are derived from their sterochemistry and orientational ability, for example some have liquid crystal characteristics, and others may be of value in Langmuir Blodgett films. Others may absorb electromagnetic radiation and be useful in solution for this purpose, eg in liquid crystals. Other possible uses, where M is a large metal ion such as Pd or Pt are as one dimensional conductors, eg potentially or molecular wires.

The Pc of the present invention may be polymerised, and polymerisation may take place across double bonds in unsaturated side chains or by ester or amide formation or any other suitable polymerisation technique which will be apparent to those skilled in the art. Any polymerisation may be achieved with little or no effect on the Pc ring itself, as it possesses high stability.

The structural preferences expressed below are with reference to suitability for such uses.

Some particularly preferred structures of formula I are those of formula II below:

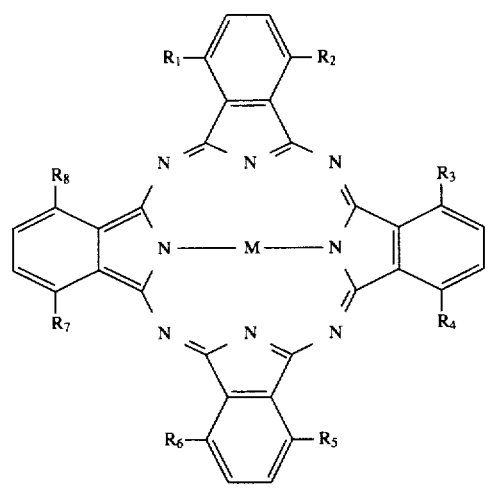

Formula II where $R_1$–$R_8$ are as defined above. Some preferred of formula II are those of formula III below.

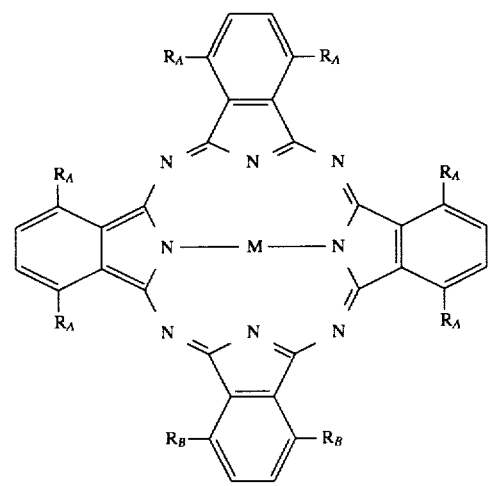

Formula III where M=metal or 2H where $R_A=R_B$=alkyl, or $R_A$= alkyl and $R_B$=—X—COO-alkyl or $R_A R_B$=—CH$_2$O-alkyl or $R_A=R_B=$

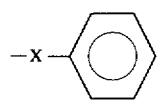

or $R_A=R_B=$—X—COZ or $R_A=R_B=$alkenyl where X and Z are as defined above. Preferably X has more than 1 carbon atom where $R_A$ or $R_B$ is —X—COZ. Particularly preferred alkyl group in formulae I, II and III above are those containing 4–12 carbon atoms particularly those with higher alkyl chain lengths.

The Pc of formula I, II or III may be metal free ie M may be 2H (one bonded to each of the bonding N atoms shown) or M may be a metal atom which may be present as the metal, ie of oxidation state zero or as chloride, bromide or oxide thereof when M represents a metal atom. Examples of suitable metals are Cu, Ni, Mg, Pb, V, Pd, Pt, Co, Nb, Al, Sn, Zn, Ca, In, Ga, Fe and Ge. Preferably M is 2 H but if a metal is present is is preferably copper.

1. Discotic Liquid Crystals

The class of Pc of formula III where $R_A=R_B$=alkyl are particular likely to show discotic liquid crystal phases. The alkyl groups $R_A$, $R_B$ in this case may be n-alkyl or branched chain, and preferably contain 4–12 carbon atoms, longer carbon chains being preferred.

Pc of formula III where $R_A$ is alkyl, eg n-alkyl, and $R_B$ is —CM$_2$)$_n$ COOR$^1$ where R$^1$ is C$_1$–C$_{10}$ alkyl are also likely to show discotic liquid crystal phases. Longer R$^1$ chains are preferred, especially with R$^1$ being n-alkyl. An optimum valve for n appears to be 3, but the range of n between 1–10 is also useful.

Discotic liquid crystal phases are also likely to be shown by pc where $R_A=R_B$=—CH$_2$O-alkyl, particularly where the alkyl group is a C$_3$–C$_{12}$ alkyl, preferably n-alkyl but branched alkyl groups such as 2-methylbutyl or 2-octyl may also be used.

A further class of Pc of formula III which are likely to show discotic liquid crystal phases are those where $R_A=R_B=$ an alkenyl group of structure —(CH$_2$)$_n$CH=CH—Z where n is 0–10 and Z is H or alkyl, the whole containing 2–20 carbon atoms. An example of such a group is pentenyl —(CH$_2$)$_3$ CH=CH$_2$.

The discotic liquid crystal phases may be columnar mesophases (eg hexagonal or rectangular) or lenticular mesophases. These mesophases have definite temperature ranges and have birefringent textures. Compounds of Formulae I, II and III may also show orientational order when dissolved in a nematic, smectic or lenticular mesophase.

The fact that the metal and metal free octa-substituted alkylphthalocyanines of the present invention may exhibit liquid crystal properties is most unexpected considering that the substituents are simple alkyl groups and the corresponding alkoxy analogues are not liquid crystalline. Both the metal and metal-free octa-substituted alklphthalocyanines may exhibit mesomorphic behaviour. These compounds show columnar mesophaeses and the series is particularly remarkable in that mesomorphic behaviour may be observed in derivatives with chain lengths as short as C$_6$.

Prior to the present invention phthalocyanines exhibiting thermotropic liquid crystalline behaviour have been substituted only with long chain alkoxyalkyl groups at some or all of the peripheral (2, 3, 9, 10, 16, 17, 23, 24) positions and no tetra-substituted phthalocyanines have been found which exhibit thermotroptc liquid crystalline behavour.

2. Solutions of Phthalocyanines

According to a further aspect of the invention there are provided novel-solutions of at least one Pc of formula I, II or III above, or of formula IV below, in a solvent;

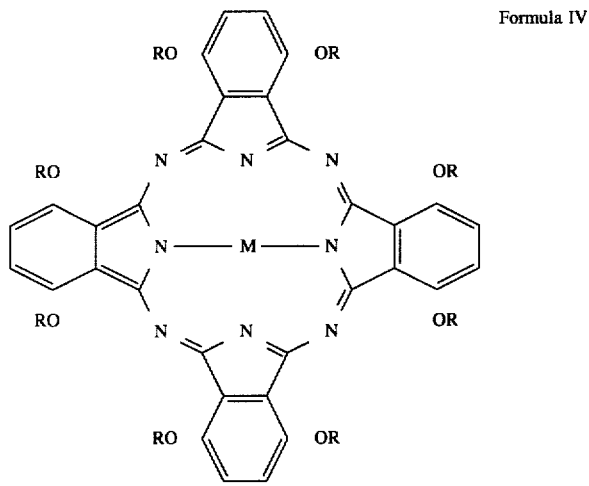

Formula IV and wherein in formula IV M is a metal atom or 2H and each R is independently selected from $C_1$–$C_{15}$ alkyl, $C_7$–$C_{20}$ alkaryl or $C_6$–$C_{14}$ aryl wherein alkaryl is

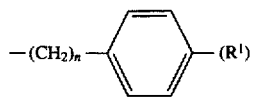

where n is 0 to 7 and ($R^1$) indicates that one or more $C_1$–$C_7$ alkyl substituents may be present on the ring characterised in that the solvent is or contains a liquid crystal material which is capable of undergoing phase transitions upon changes in temperature. In formula IV all the substituents R are not methyl simultaneously.

The solvent may be an inorganic solvent, such as water or an organic solvent such as THF and contain a liquid crystal material which is capable of undergoing phase transitions or a transition to an isotropic liquid on changes in temperature.

In such a solution the Pc may be capable of absorbing radiation over all or part of the electromagnetic spectrum from the visible to the near red infra-red region. When the solvent is or contains a liquid crystal material, then absorption of radiation, eg as emitted by a laser, may be used to address areas within the liquid crystal material. Preferably the Pc has a formula IV, with R preferably being $C_2$–$C_{12}$ alkyl and most preferably $C_5$ alkyl. M is selected from 2H or a metal atom, ie of oxidation state zero or as a chloride, bromide or oxide thereof where M represents a metal atom. Examples of suitable metals are Cu, Ni, Mg, Pb, V, Pd, Co, Nb, Al, Sn, Zn, Ca, In, Ga, Fe and Ge. Preferably M is 2H but if a metal is present it is preferably Cu.

Any liquid crystal material may be used, provided it possesses at least two metastable states at different temperatures, one highly transparent to visible light and one highly scattering. Thus when addressed by a laser the material will absorb energy through the phthalocyanine and will pass from the one state to the other or alternatively the phthalocyanine may itself or in conjunction with liquid crystalline materials both absorb energy and change states if the phthalocyanine is liquid crystalline and possesses at least two metastable states.

The liquid crystal material may exhibit a metastable state which is a smectic phase, such as a smectic A phase.

Materials when in a smectic, especially a smectic A phase, are generally highly viscous which is important when a long term memory effect in the material is desired. The material may exhibit a smectic phase and, at a higher temperature, a nematic phase. The material preferably contains at least one cyanobiphenyl compound, because such materials are typical of those known in the art which exhibit smectic or smectic - and - nematic phases at useful temperatures.

Many such liquid crystal materials are known, for example the material S2 available from BDH Ltd (UK) which has a composition:

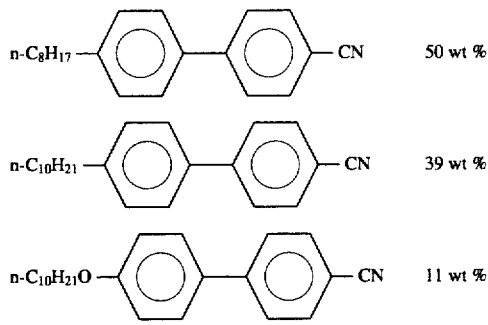

Other suitable liquid crystal materials of this type include the materials K24, K27, K30, K33, K36, S1, S3, S4 and S5 also available commercially from BDH Ltd.

Alternatively the liquid crystal material may be one which shows a nematic to isotropic transition, for example the material E7, available from BDH Ltd and which has a composition:

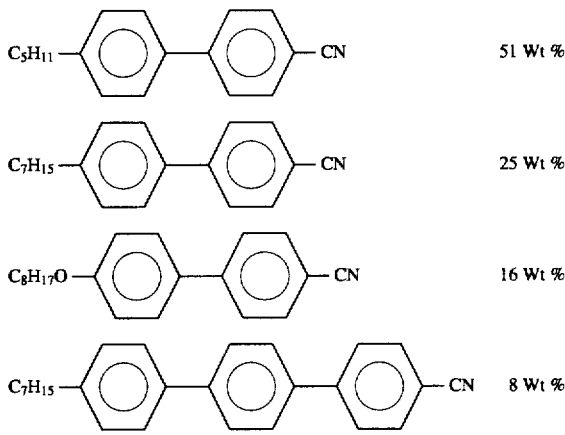

The liquid crystal material preferably contains from 0.01% to 5%, most preferably from 0.05 to 2%, by weight of the phthalocyanine(s).

Whilst no specific limits are set for the range referred to of visible to near infra-red electromagnetic radiation this will generally be between $10^{-7}$M and $10^{-5}$M.

Within this range compounds which absorb strongly at wavelengths equivalent to those emitted by Galium arsenide lasers (750–850 nm) or at other suitable laser emitting wavelengths may be particularly useful as dyes in laser addressed information storage systems which use the effects described above.

Typically phthalocyanines show strong absorption in the visible region (Q-band) for example metal-free phthalocyanine ($H_2Pc$)$_1$ max 665,698; copper phthalocyanine (Cu Pc) λ max 678 nm. With phthalocyanines according to this aspect of the present invention the band may be shifted further to the red especially with alkoxy substituents on the benzene rings and particularly when substituents are at the sites, which are alpha to the point of fusion to the heterocyclic ring (the 3,6 positions). As a result there is therefore the potential for tuning the Q-band absorption to match the wavelengths of GaAlAs laser light or other appropriate laser wavelengths.

This tuning may also be achieved or enhanced by the addition of metal ions (M) to the centre of the phthalocyanine ring. This is shown in Table 5 which reveals that alteration of the central ion can provide a means of tuning the wavelength of Q-band absorption especially in the far red and near infra-red region of the spectrum. Preferred metals are Cu,Zn and Ni most preferably if present M is copper.

The use of alkoxy chain lengths greater than $C_1$ (methoxy) as substituents on the phthalocyanine ring has been found to greatly enhance the phthalocyanines solubility in organic solvents such as liquid crystalline materials. The known octamethoxy substituted phthalocyanine of formula IV where R is $CH_3$ are completely insoluable in organic solvents and liquid crystals.

3. Langmuir Blodgett films containing Phtholocyanines

Certain Pc of formulae I, II and III may form good Longmuir Blodgett (LB) films.

According to a further aspect of the invention there is the fore provided a Longmuir Blodgett film which contains at least one layer of a Pc of formula I, II or III.

Preferred Pc for use in this aspect of the invention are those of formula III where M is metal or 2H, $R_A$ is alkyl and $R_B$ is —X—COO-alkyl or —X—COZ where X and Z are as defined above. Preferably X is a single bond or a $C_{1-6}$ chain eg containing 3 carbons. Preferably the alkyl group $R_A$ contains 8 to 10 carbon atoms, and that in $R_B$ 1–8 carbon atoms. Z is preferably —OH.

In most preferred compounds of Formula III for LB films or $R_A$ is $C_8$–$C_{10}$, $R_B$ is $(CH_2)_3COOH$ and M is copper or 2H specifically where (i)  $R_A=C_8H_{17} R_B=(CH_2)_3$ COOH M=2H (ii) 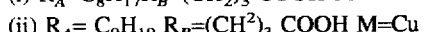 $R_A= C_9H_{19}$ $R_B=(CH^2)_3$ COOH M=Cu (iii) 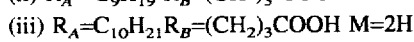 $R_A=C_{10}H_{21} R_B=(CH_2)_3COOH$ M=2H LB films of this aspect of the invention may be laid down by entirely conventional and well known techniques. Generally on LB film is prepared by depositing a monolayer of a surface-active material onto a water surface, using well established techniques. The molecules of the surface active material align in the monolayer, the hydrophilic ends remaining in the water, and the hydrophobic end projecting out of the surface. By other known techniques, this monolayer may be transferred essentially intact onto the surface of a solid substrate, and further monolayers deposited on the layer on the substrate to form a film, ie a Langmuir-Blodgett film.

In certain circumstances it may be desirable to polymerise the phthalocyanines of this aspect of the present invention. This may take place in various ways depending upon the phthalocyanine substituents. In the case where the substituents are a unsaturated eg an alkenyl group then this may be used to polymerise the phthalocyanine by known means for example photo-chemically.

Alternatively phthalocyanines may be linked through the utilisation of metal halides as M and thereby provide ring coupling via the metal halide.

LB films of this aspect of the invention may be particularly useful. Crystal spectra of these films in many cases show that they retain order over millimeter square areas and are well ordered. Infra-red spectroscopy indicates that they can often be prepared in a water-free state. Some films of this aspect of the invention may undergo changes to their film structure on heating to eg 120° C., and these changes may in some cases be permanent and in others reversible. They are thus potentially on optical or thermically addressable storage medium.

4. Electro-Optical DEvices using phtholocyanines

One such device uses a solution of a Pc in a liquid crystal material as described under 2 above.

According to a further aspect of the present invention, there is provided a liquid crystal electro-optical device including two electrically-insulating, optically transparent substrates, electrodes on the inner surfaces of the substrates, and a film of a dielectric material contained between the substrates which material comprises a solution of a Pc in a liquid crystal material as described under 2 above.

The device is preferably a smectic to nematic phase change device.

The device may be used in a laser addressed, particularly a Ga $Al_{1-x}$ As (where x is preferably 1) laser addressed projection smectic storage display. The device preferably has an absorbance to incident laser energy of greater than 0.2, most preferably greater than 0.5, by providing a suitable film thickness and phthalocyanine concentration. The thickness of the film is preferably between 5 and 30 microns.

The use of the above device, containing the useful smectic/nematic/isotropic liquid crystal (LC) material described above, in a projection display application will now be described.

"Total erase" of any image on the device is achieved by applying a strong AC electric field between the conducting layers which aligns all molecules perpendicular to the device walls producing the overall clear state. To "write" information on to this clear background, the scanning laser beam heats the LC Locally into the totally disordered, isotropic phase. The heated regions then lose heat very rapidly to the surroundings cooling almost instantly back to the smectic phase and "freezing in" a large portion of the random molecular alignment of the isotropic phase. This leaves lines of the strongly scattering texture wherever the laser scans. To "selectively erase" a piece of written information requires the laser to scan again over the same path while a weak electric field is applied. The scanned material is once again heated into the isotropic phase, but as it cools through the low viscosity, nematic phase-the electric field is strong enough to realign the molecules perpendicular to the cell walls.

5. Proparation of Phtholocyanines

The present phthalocyanines may most readily be prepared by reacting a benzenedi-carbonitrile of general formula IV

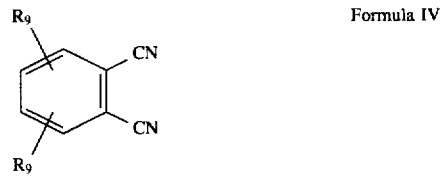

Formula IV where $R_9$ represents any of $R_1$–$R_8$ as shown informulae II and III, with an alkali metal alkoxide of general formula $ROM^1$ wherein R is an optionally substituted $C_1$ to $C_{20}$ especially $C_3$ to $C_{15}$ alkyl group and $M^1$ is an alkali metal, especially lithium or sodium.

Preferably the conversion of the benzenedicarbonitrile to the phthalocyanine is effected in the alcohol (ROH) corresponding to the alkoxide ($ROM^1$) employed, ie ethoxide in ethanol, pentoxide in pentanol.

The benzenedicarbonitrile of general formula IV may be prepared by reacting a 2,5 disubstituted furan of general formula V

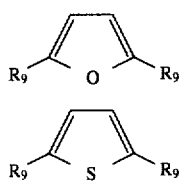

Formula V

Formula Va wherein the groups R₉ are as defined above with trans 1, 2 dicyanoethane.

The 2, 5 disubstituted furan of general formula V may be prepared in a two stage reaction by reacting furan with a haloalkane wherein the alkane is of the type required in the general formula IV and depicted as R₉. Thus if R₉ is n-heptane than a suitable haloalkane woult be 1-bromoheptane.

The first stage of the reaction involves reacting furan with haloalkane in the present of a suitable alkali metal alkyl such as n-butyl lithium. This yields the 2-substituted furan which may then be reacted again with haloalkane and alkali metal alkyl to produce the 2, 5 disubstituted furan.

This route is shown schematically in FIG. 1.

Alternatively the benzenedicarbonitriles of general formula IV may be prepared by reacting a 2,5 disubstituted thiophene of general. formula V(a) where the groups R₉ are as defined above with metachloro perbenzoic acid (MCPBA) to yield a 2,5 disubstituted thiophene 1, 1 dioxide. The 2,6-disubstituted thiophene 1,1-dioxide may be reacted with fumaronitrile which under the correct conditions will yield 3,6-disubstituted benzenedicarbonitrile. An entire reaction sequence from thiophene to benzene dicarbonitrile is shown schematically in FIG. 2.

If alkoxy substituted phthalocyanines are required then these are preferably produced from 1,2-dicyano-3, 6-dialkoxybenzene made from 1,2-dicyano-3, 6-dihydrexybenzene as shown in FIG. 3.

6. Examples

The present invention will now be described by way of example only with reference to the accompanying FIGS. 1–14. The compounds 7d–7k, 8b–8e, 9 and 10 in Tables 3,4,5 and 6 and FIG. 6, and the corresponding starting starting materials in Table 2, FIG. 7, Table 7 and FIGS. 8,9 10 are not compounds of the invention but are described in relation to their presence in solutions of the invention.

Figure 6:
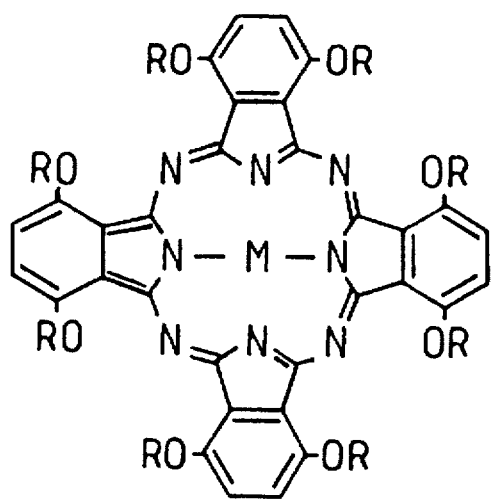
Figure 7:
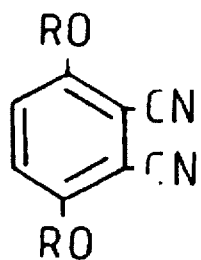

FIGS. 6 and 7 refer to the generalised formulae for the octasubstituted alkoxyphthalocyanines and the alkoxyphthalonitrile precursors for reference to tables 2,3, 4,5 and 6.

Figure 8:
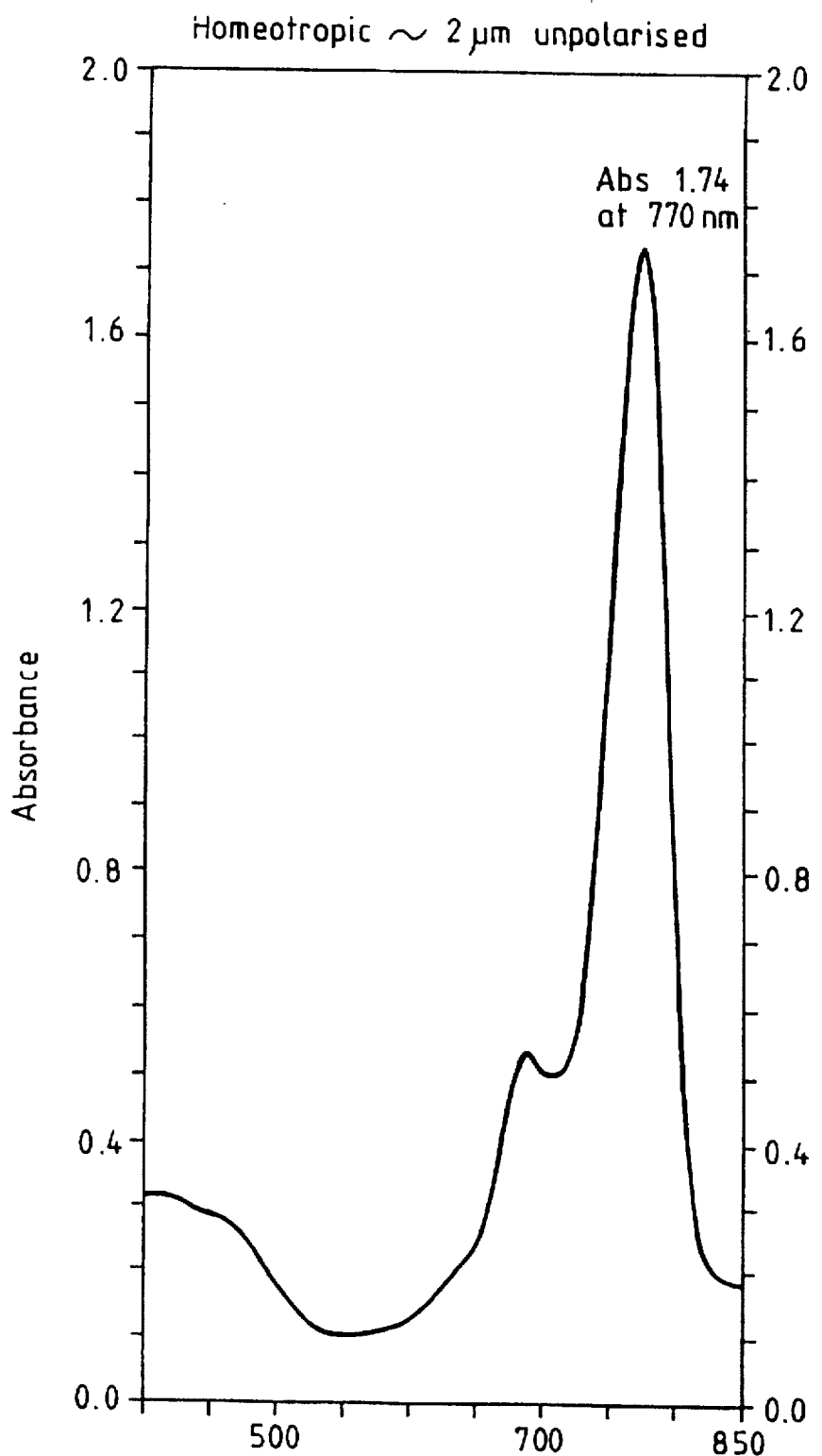
Figure 9:
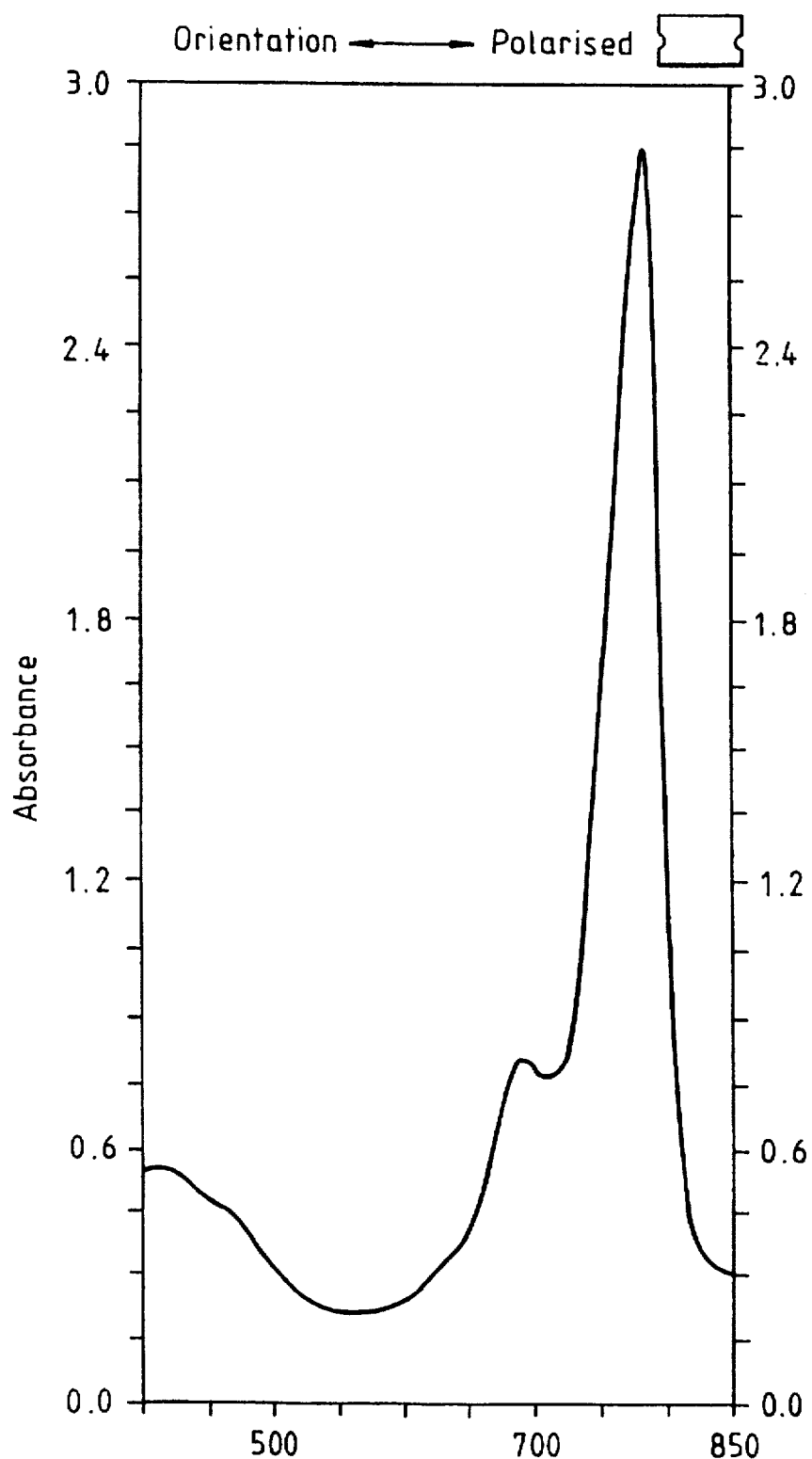
Figure 10:
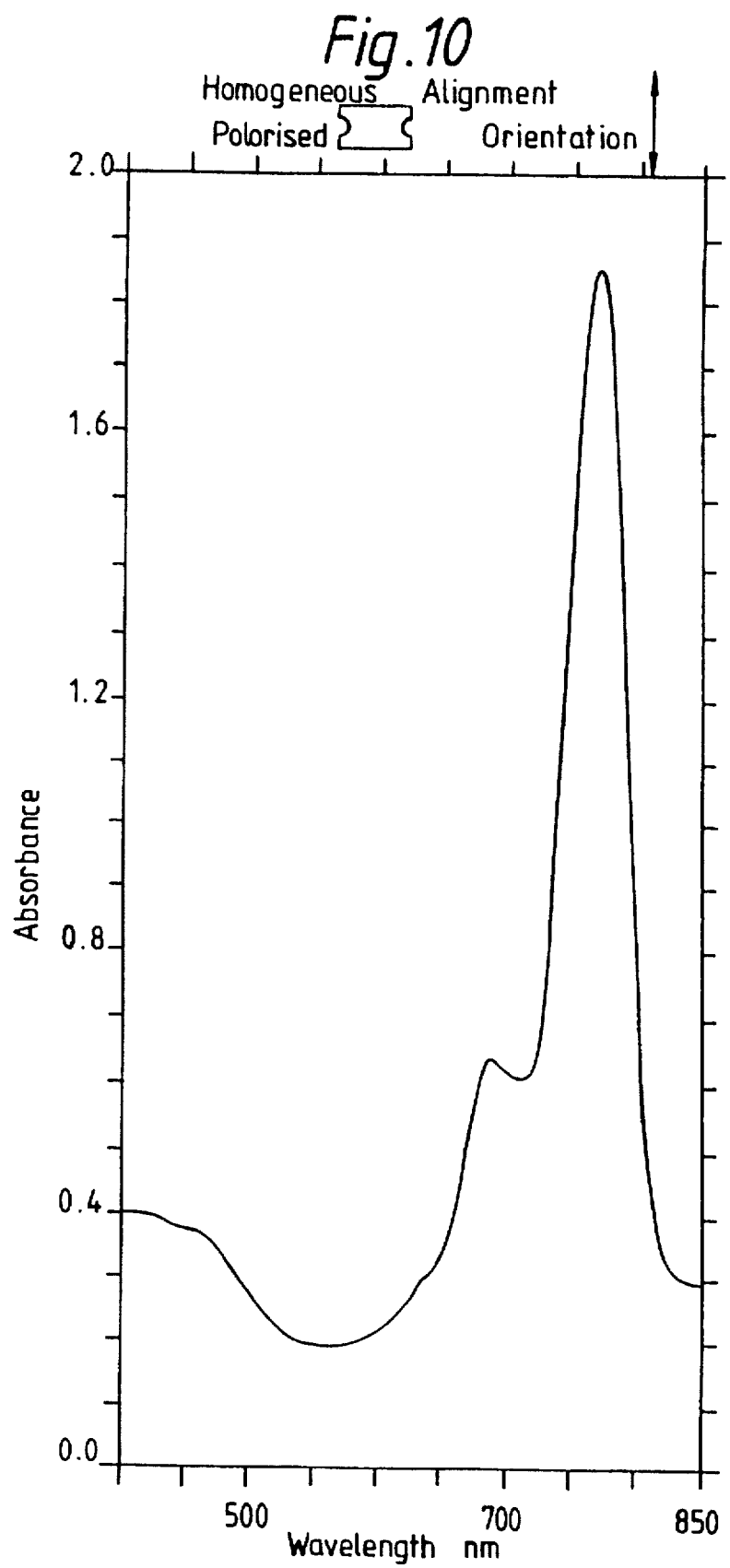

FIGS. 8, 9 and 10 show absorption spectra of metal free C₅H₁₁O phthalocyanine in E7.

Figure 11:
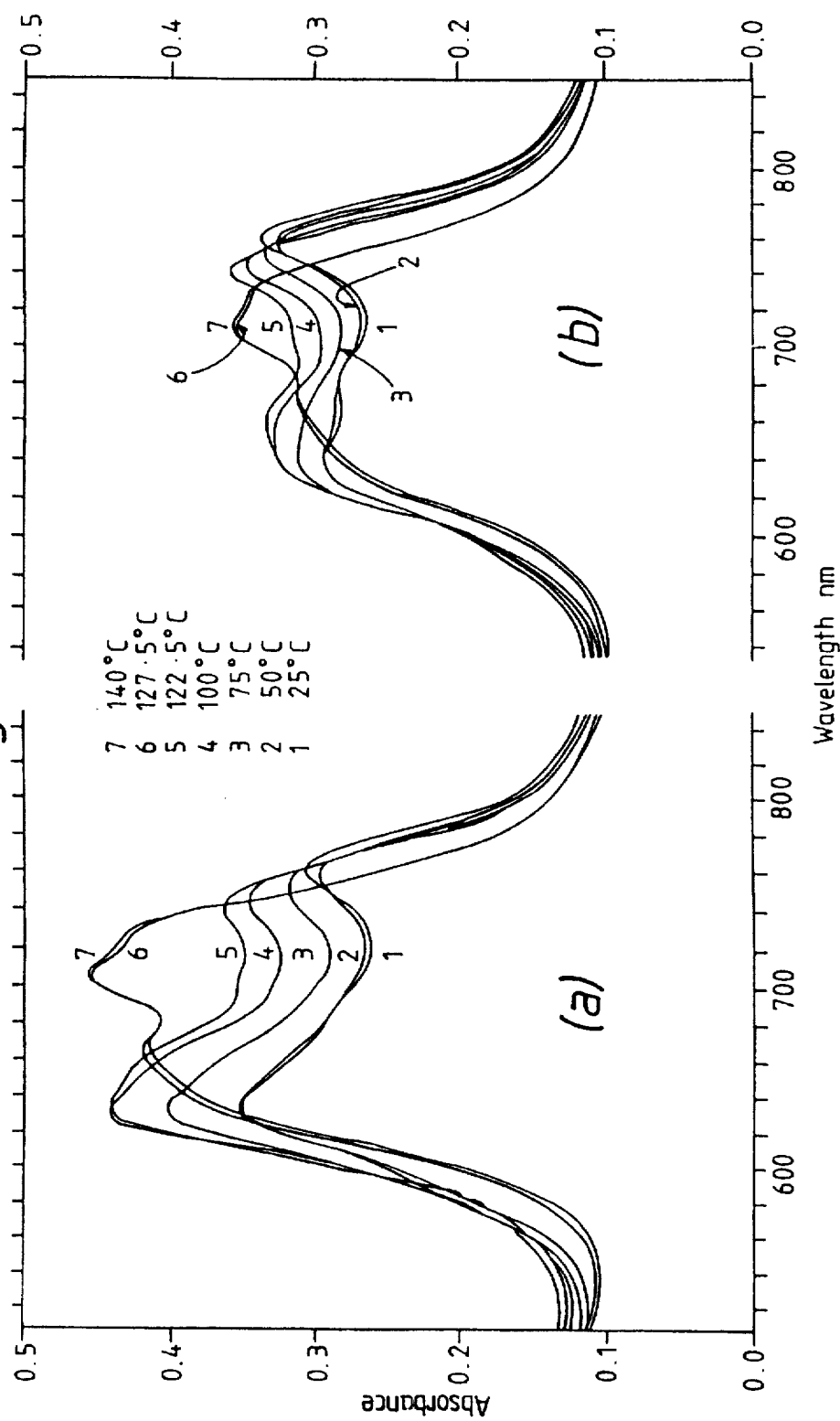

FIG. 11 shows the polarised absorption spectra of a Langmuir-Blodgett film of bis(carboxypropyl)hexa-n-octyl phthalocyanine (metal free).

Figure 12:
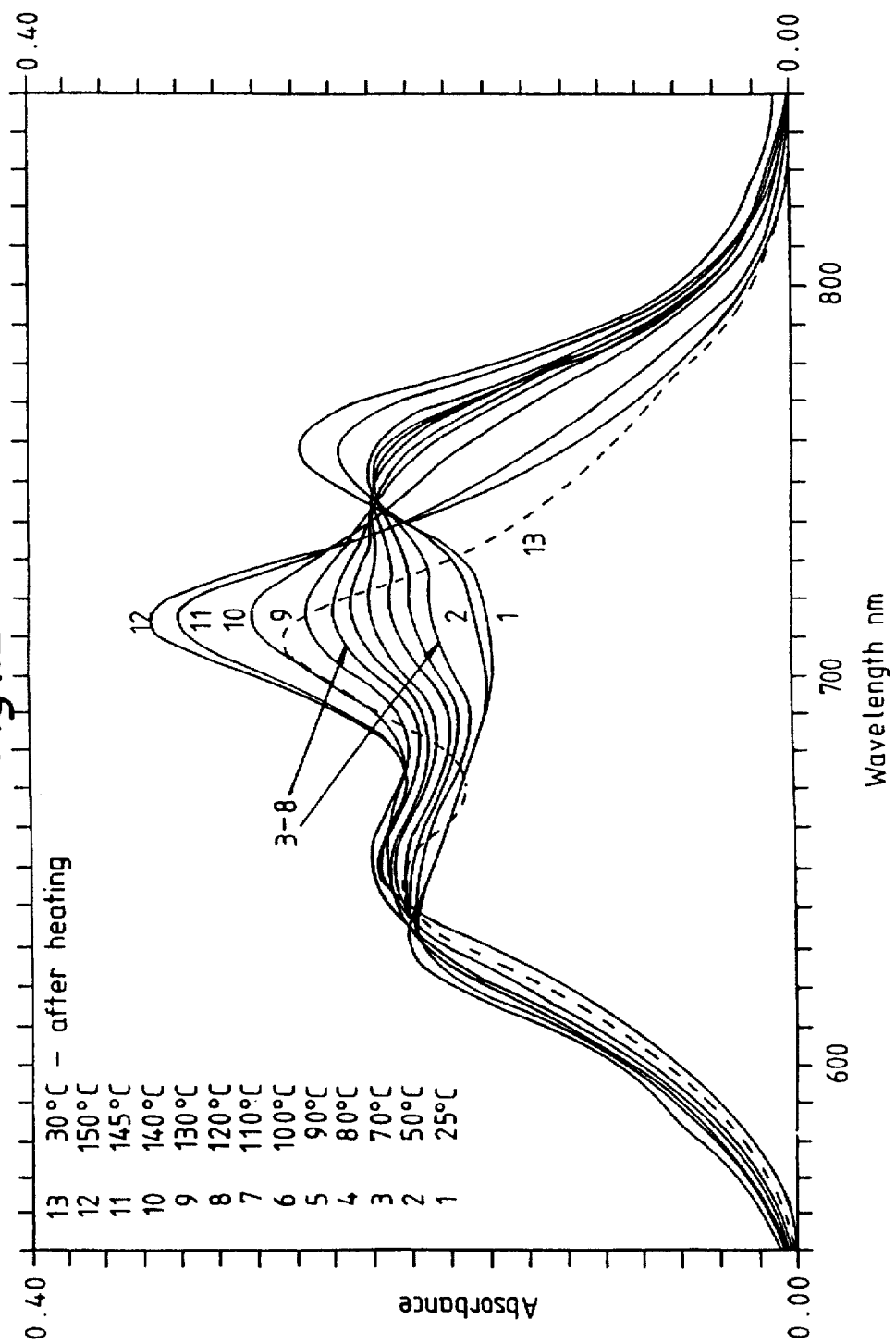

FIG. 12 shows the polarised absorption spectra E11d of a Langmuir-Blodgett film of copper bis(carboxypropyl)hexo-n-nonyl phthalocyanine.

Figure 13:
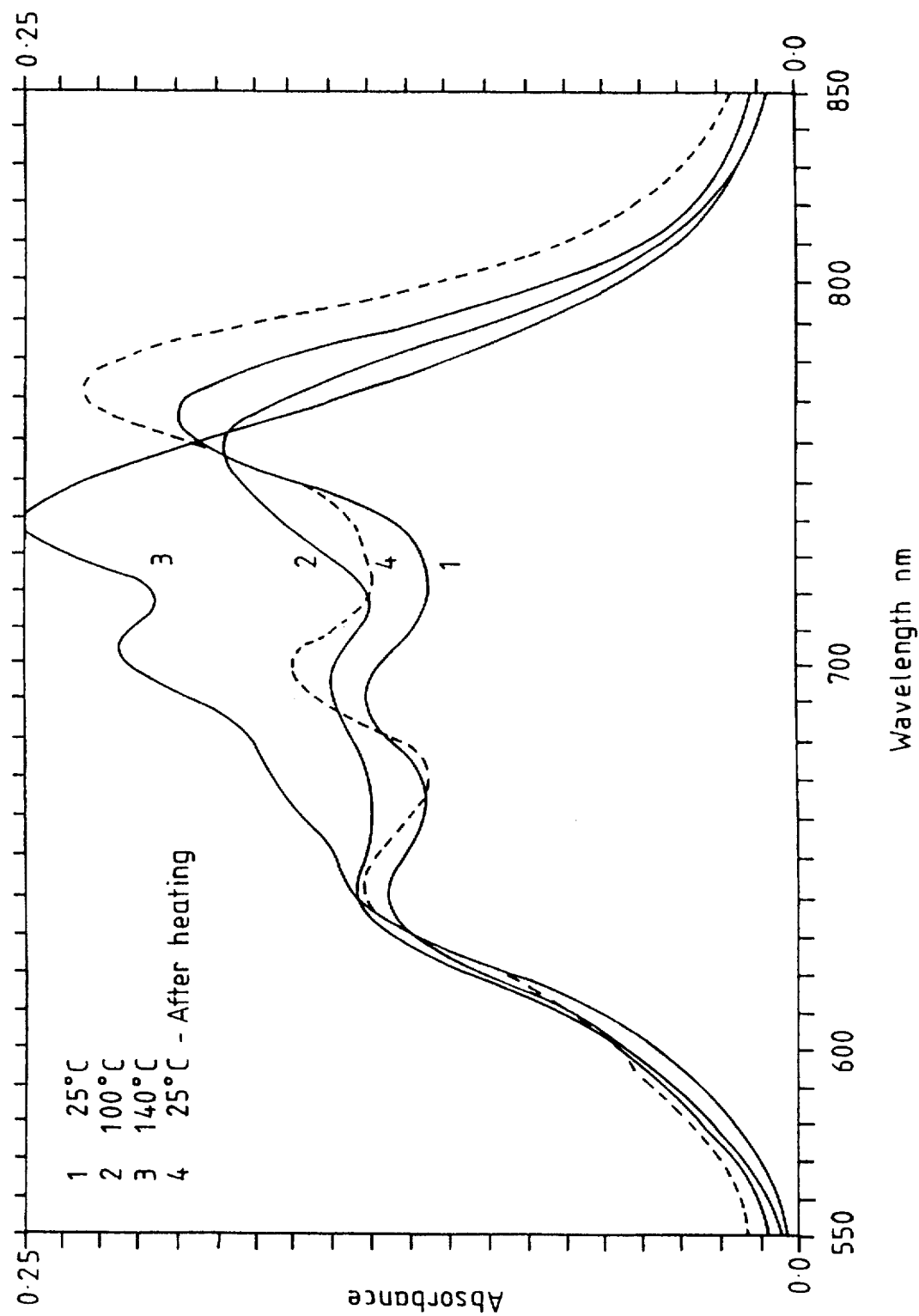
Figure 14:
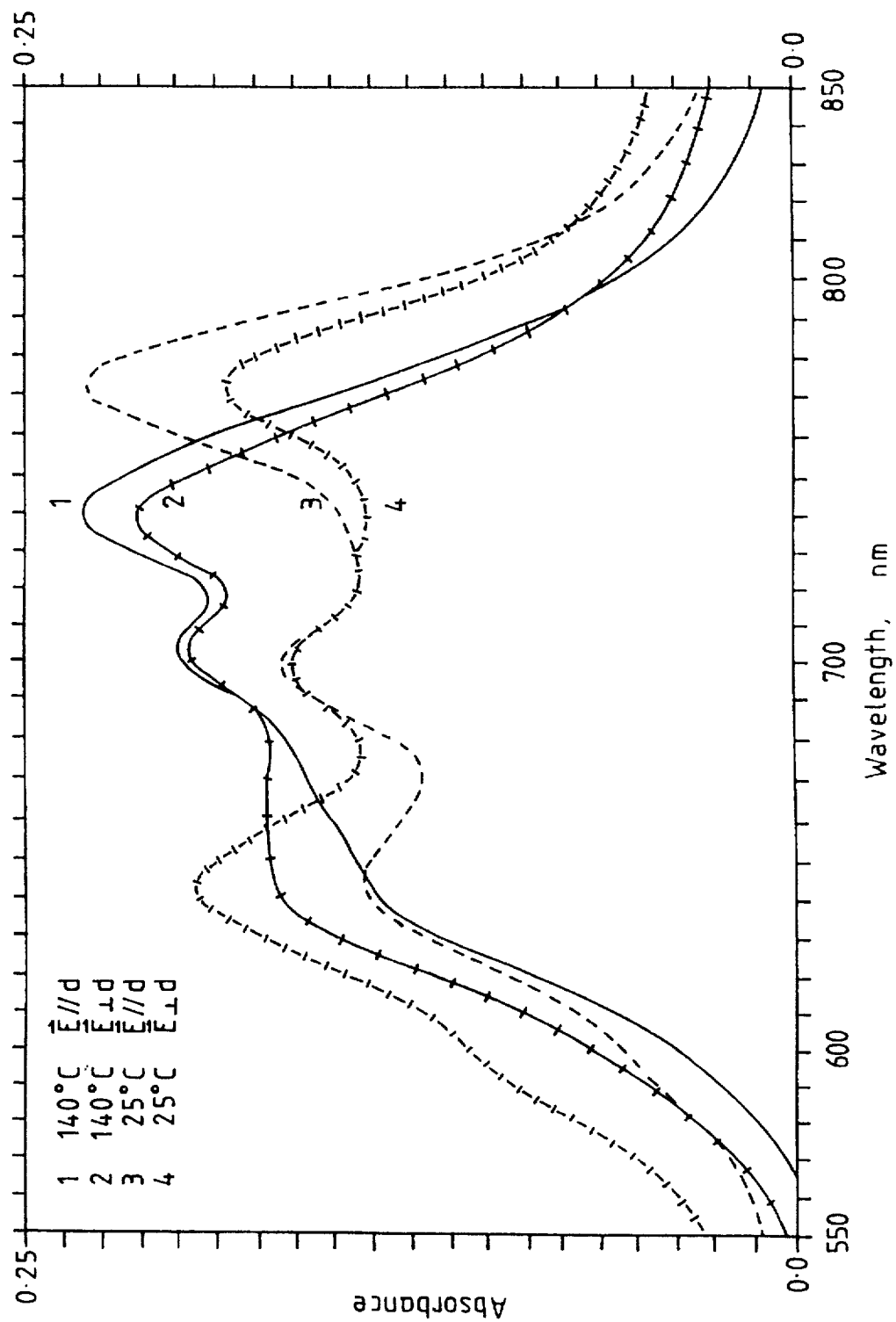

FIGS. 13 and 14 shows respectively the polarised absorption spectra of a Langmuir-Blodgett film of metal free bis(carboxypropyl) hexa-n-decyl phthalocyanine(s) between 25° and 140° and an cooling to 25° C. (E11d) and (b) during the third heating and cooling cycle.

EXAMPLE 1

Figure 1:
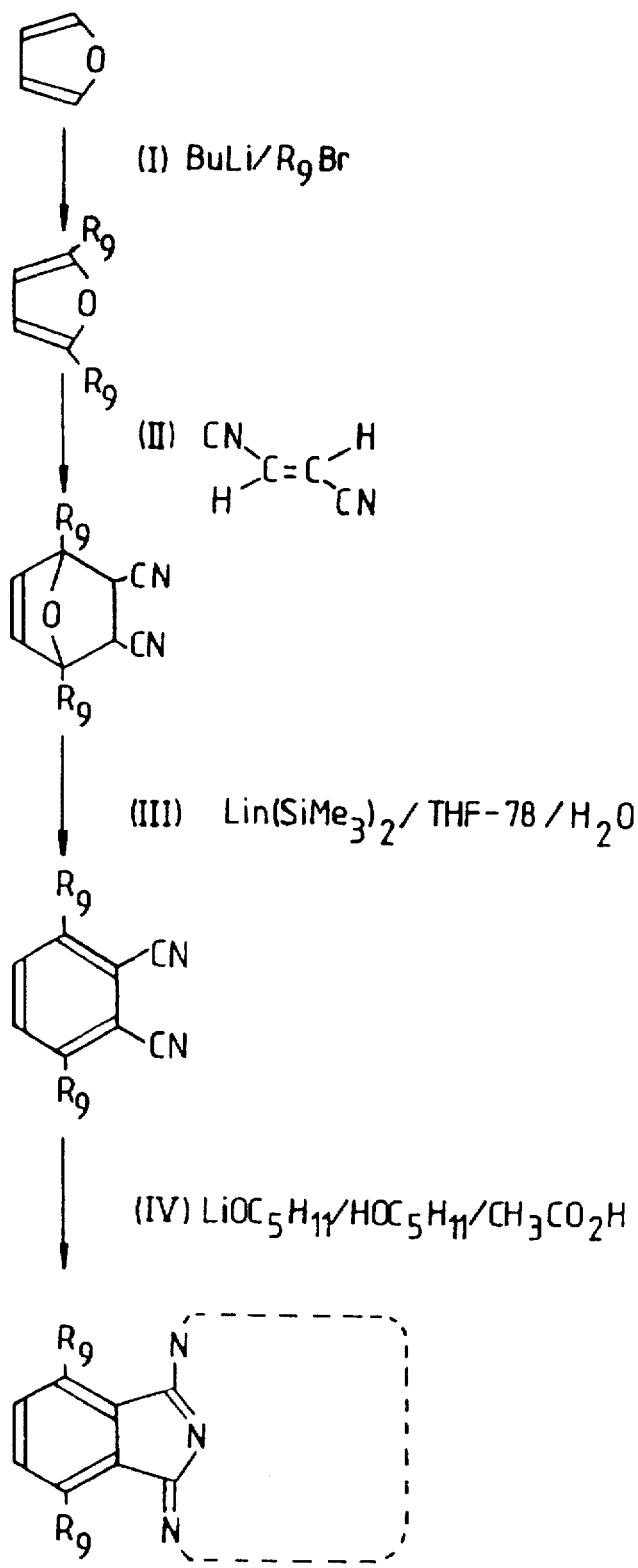
FIG. 1 illustrates a general preparation route to phthalocyanines with only one type of group substituent.

Preparation of 1, 4, 8, 11, 15, 18, 22, 25 octaheptyl phthalocyanine using the route shown in FIG. 1

(a) Preparation of 2 Heptylfuran

Furan (20.5 g, 0.3 mol) was added dropwise to a stirred solution of n-butyl lithium (0.3 mol, 200 ml of a 1.6 molar solution in hexane) and dry THF (130 ml) in a nitrogen atmosphere at −15° C. The mixture was stirred for 24 hours at room temperature. 1-Bromoheptane (53.7 g, 0.3 mol) was added to the precipitated furan salt and the mixture stirred for a further 24 hours at room temperature.

The brown reaction mixture was poured onto ice and the crude product extracted with diethyl either (3×50 ml). The organic layer was dried (MgSO₄) and the solvents were removed under reduced pressure. The resultant crude product was dissolved in dichloromethane and eluted through a silica column to remove residual polar impurities. The dichloromethane was removed to afford 2-heptyl furan (38 g 85% yield). S7.23 (1 H, S), 6.20 (1H, m), 5.90 (1Hm), 2.65 (2H, t), 2.65 (2H, t), 1.20–1.95 (10H, m), 0.90 (3H, t).

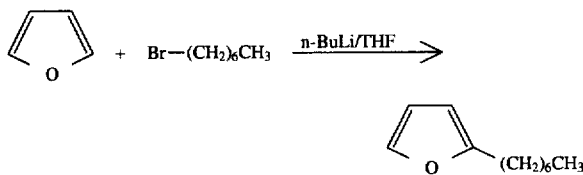

(b) Preparation of 2, 5-Diheptylfuran

2-Heptylfuran (38 g, 0.23 mol) was added dropwise to a stirred solution of n-butyl lithium (0.23 mol, 156 ml of a 1.6 molar solution in hexane) in dry THF (100 ml). After stirring for 24 hours at room temperature, 1-bromoheptane (41 g, 0.23 mol) was added and stirring continued for a further 24 hours.

The resulting mixture was poured onto ice and the product extracted with diethyl ether (3×50 ml). The organic layer was dried (MgSO₄) and evaporated to dryness under reduced pressure and the crude product heated to 150° C., at (18 mm/Hg), to remove excess 1-bromoheptane. The 2, 5-diheptylfuran was dissolved in dichloromethane and eluted through a silica column to remove residual polar impurities. After removal of the dichloromethane the 2, 5-diheptylfuran (32 g 55% yield) was obtained as a brown liquid S5.3 (2H, S), 2.55 (4H, t), 1.30 (20H, m), 1.05 (6H, t)

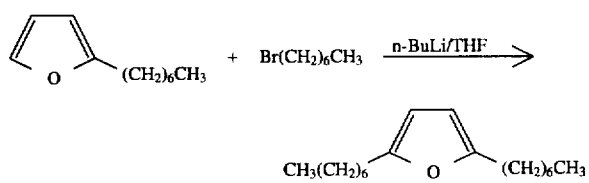

(c) Preparation of 1, 2-dicyano - 3, 6-diheptylbenzene 2, 5-Diheptylfuran (32 g, 0.12 mol) and fumeranitrile (9.5 g, 0.12 mol) were dissolved in the minimum amount of dry THF (35 ml) and left for one week at room temperature. After this period the solvent was removed from a portion of the mixture, using a rotary evaporator without external heating.

The slurry (12 g) was dissolved in freshly distilled THF (100 ml). The reaction vessel was flushed with nitrogen and the temperature of the solution reduced to −78° C. On cooling, lithuim bis- (trimethylsilyl) amide (50 ml) was added dropwise over 1 hour with vigorous stirring. The solution was neutralised with an excess of saturated ammonium chloride solution and its temperature allowed to rise. The crude product was extracted wity diethyl ether (3×50 ml), dried (Mg SO$_4$) and the solvents removed on a rotary evaporator.

The resultant black oil was eluted through a silica column with toluene. When the toluene was removed, under reduced pressure, a yellow solid was obtained which was recrystallised from ethanol to afford 1, 2-dicyano - 3, 6-diheptylbenzene (2.2 g 25 yield) as colourless needles mpt 4.6° C. (Found C, 81.34; H, 10.07; N, 8.51. Calculated for $C_{22}H_{32}N_2$: C, 81.48; H, 9.88; N, 8.64%) (Nujol) 2225 cm (GEN). S 7.45 (2H, S), 2.85 (4H,t), 1.34 (20 H,mO, 1.85 (6 H,t)

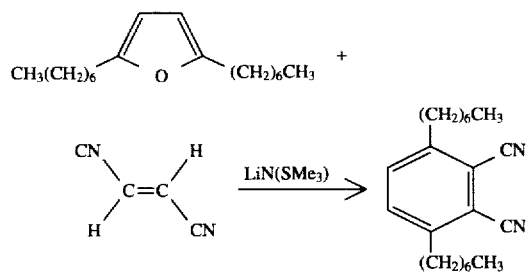

(d) Preparation of 1, 4, 8, 11, 15, 18, 22, 25 - Octaheptyl - 29H, 31H - phthalocyanine (ie M= 2H where the 29 and 31 positions are as defined above)

3.6-Diheptylpthalonitrile (0.7 g, 2 mmol) was dissolved in pentan-1-ol (7 ml) and lithium (0.3 g) was added in small portions which caused an exothermic reaction and resulted in the solution turning a dark green colour. The reaction mixture was heated at reflux for 0–5 hour. After cooling, the mixture was dissolved in dry acetone (30 ml), filtered, and acetic acid added (20 ml) which caused the phthalocyanine to be precipitated. The crude product was filtered and recrystallised from a dry acetone/THF mixture to afford octaheptylphthalocyanine (150 mg, 21% yield) as blue feather-like crystals. (Found C,81.04; H,10.16; N,8.53, calculated C,81.36; H,10.02; N,8.63%) S, 7.8(8H,S), 4.52 (16H,t), 1.20–8 2.50 (80H,m) 0.90(24H,t)

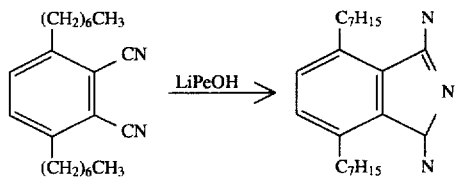

(e) Preparation of 1, 4, 8, 11, 15, 18, 22, 25 - Octaheptyl copper phthalocyanine.

Metalfree octaheptylphthalocyanine (70 mg) was dissolved in pentan-2-ol (5 ml) at reflux temperature and a large excess of copper acetate (600 mg) added. The reaction was cooled after 1 hour and the mixture dissolved in dry THF (20 ml). The solution was filtered to remove the excess copper acetate. The crude copper octaheptylphtalocyanine was precipitated by addition of dry acetone and then recrystallised from a dry acetone/THF mixture (Found C,77.49; H,9.54; N,8.15 $C_{88}H_{128}N_8Cu$ calculated C,77.67; H,9.42; N,8.24%).

Figure 4:
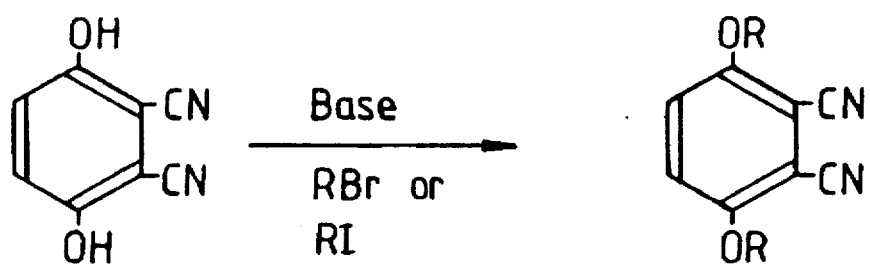
FIG. 4 shows a method of producing alkoxyphthalonitriles for conversion to alkoxyphthalocyanines.
Figure 5:
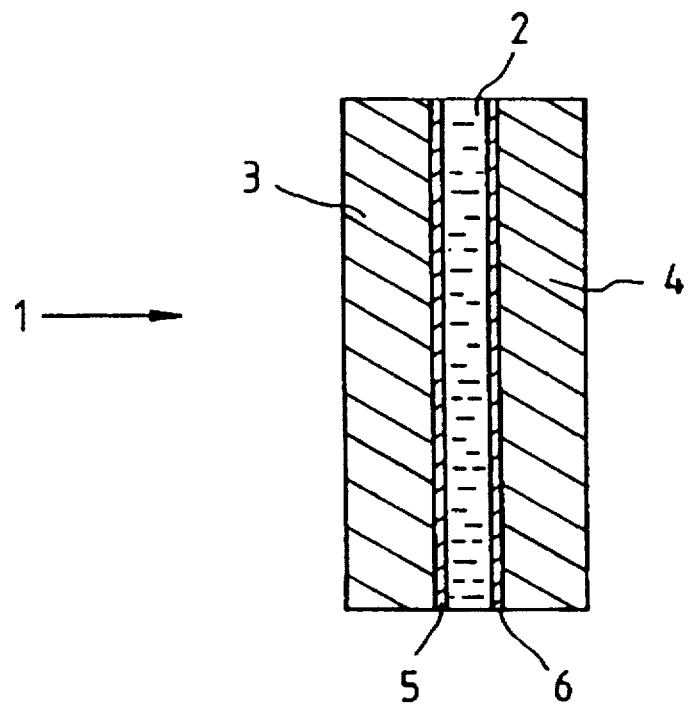
FIG. 5 illustrates an electro-optical device containing a liquid crystal material having a phthalocyanine dissolved therein.

The liquid crystal product of Example 1(d) or 1(e) was dispersed within the liquid crystal cell 1 illustrated in FIG. 4 in the form of a 12 microns thick film 2 between two transparent glass slides 3, 4. The internal faces of both slides are coated with thin layers 5, 6 of indium tin oxide, a transparent electrical conductor. Electric fields may thus be applied across the film.

The properties of a number of phthalocyanines of the present invention which were prepared by an analogous route to that described in Example 1 are listed in Table 1 below. In table 1 $R_1$–$R_8$ are defined with reference to formula II.

The thermal behaviour was observed both optically using a Vickers (Trade Mark) polarising microscope in conjunction with a Mettler FP 52 (Trade Mark) hot stage, and by differential scanning calorimetry using a Mettler TA 3000 with Mettler DSC 30 cell (Mettler is a registered Trade Mark) thermal analyser. Observations of mesophase transitions was by cooling from the isotropic liquid.

TABLE 1

| M | $R_1$–$R_2$ | $R_3R_8$ | C-I | C-$D_1$ | C-$D_2$ | C-$D_3$ | $D_2$-$D_1$ | $D_3$-$D_1$ | $D_1$-I | $D_4$-$D_3$ |
|---|---|---|---|---|---|---|---|---|---|---|
| 2H | $C_4H_9$ | $C_4H_9$ | 230 | | | | | | | |
| 2H | $C_5H_{11}$ | $C_5H_{11}$ | 219 | | | | | | | |
| 2H | $C_6H_{13}$ | $C_6H_{13}$ | | 161 | | | | | 171.5 | |
| 2H | $C_7H_{15}$ | $C_7H_{15}$ | | | 113 | | 145 | | 163 | |
| 2H | $C_8H_{17}$ | $C_8H_{17}$ | | | | 84.5 | | 1.01 | 152 | 73.5 |
| 2H | $C_9H_{19}$ | $C_9H_{19}$ | | 103 | | | | 73.5 | 142 | |
| 2H | $C_{10}H_{21}$ | $C_{10}H_{21}$ | | 77.5 | | | | | 133 | |
| 2H | —(CH$_2$)$_3$COOC$_5$—H$_{11}$ | $C_{10}H_{21}$ | | 70 | | | | | 121 | |
| Cu | $C_4H_9$ | $C_4H_9$ | 265 | | | | | | | |
| Cu | $C_5H_{11}$ | $C_5H_{11}$ | 261 | | | | | | | |
| Cu | $C_6H_{13}$ | $C_6H_{13}$ | | | 184 | | 235.5 | | 242 | |
| Cu | $C_7H_{15}$ | $C_7H_{15}$ | | | 144.5 | | 205 | | 235.5 | |
| Cu | $C_8H_{17}$ | $C_8H_{17}$ | | | 94.5 | | 156 | | 220 | |
| Cu | $C_9H_{19}$ | $C_9H_{19}$ | | 108 | | | | 98.5 | 208 | |
| Cu | $C_{10}H_{21}$ | $10_{10}H_{21}$ | | 88 | | | | 69 | 198 | | where C is crystal
$D_1$ is discotic phase (hexagonal)

TABLE 1-continued

| M | $R_1$-$R_2$ | $R_3R_8$ | C-I | C-$D_1$ | C-$D_2$ | C-$D_3$ | $D_2$-$D_1$ | $D_3$-$D_1$ | $D_1$-I | $D_4$-$D_3$ |
|---|---|---|---|---|---|---|---|---|---|---|

$D_2$ is discotic phase (rectangular)
$D_3$ is discotic phase (rectangular)
I is isotropic liquid
All phase changes are in °C.

All phase changes are in °C.

EXAMPLE 2

Figure 2:
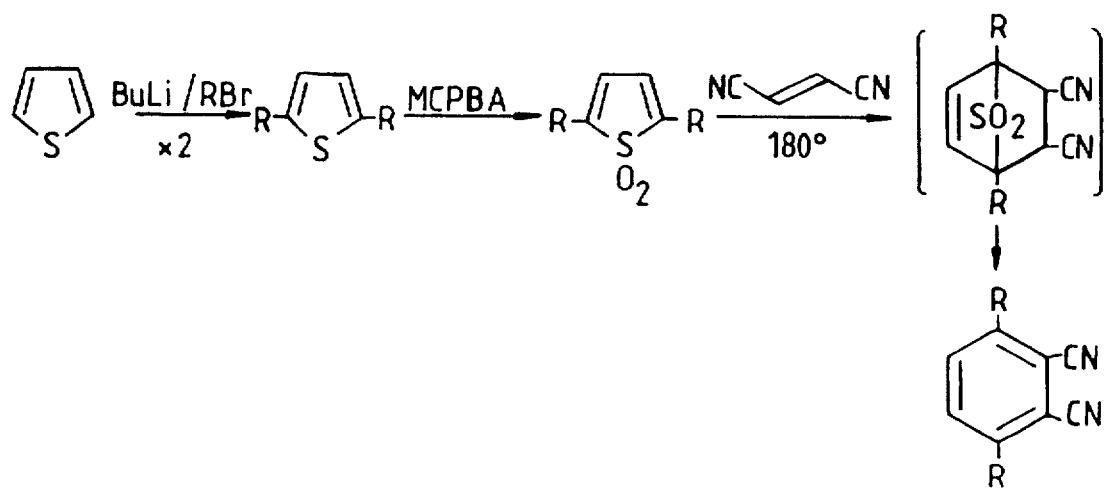
FIG. 2 shows a preparative route from thiophene to the benzenecarbonitrile or phthalonitrile precursors of the phthalocyanines.

Preparation of 3,6-diheptyphthalonitrile, the precursor to the phthalocyanine of example 1, from thiophene as shown schematically in FIG. 2.

(a) 2,5-Diheptylthiophene

In a typical experiment, 2 g (0.024 mole) of thiophene in 50 ml THF (dried over sodium) were treated with 2.5 eq. 1.5M n-BuLi in hexane (0.06 mole, 45 ml) at 0° C. When addition was completed, the mixture was stirred at room temperature for 5 hours. The solution was cooled at 0° C., quenched with 9.5 ml (0.06 mole) of 1-bromoheptane and then stirred at room temperature for 24 hours. The mixture was poured into ice, extracted with ether, dried ($MgSO_4$), and the solvent evaporated. The crude product contains mono and disubstituted thiophene in the ratio 1:2 (by $^1$H-nmr). The crude product was then treated under the same conditions as above to yield exclusively 2,5-diheptylthiophene (5.1 g, 76%) bp 225°/0.1 mm. $^1$H-nmr ($CDCl_3$) shows 86.5 (s, 2H); 2.7 (t, 4H); 0.75–2.0 (M, 26H).

(b) 2-5-Diheptylthiophene 1,1-dioxide

In a typical experiment 5 g (0.016 mole) of 2,5-diheptylthiophene was treated with 8.5 g MCPBA in $CH_2Cl_2$ (100 ml) at –15°° C. for 3 hours with stirring in the presence of $NaHCO_3$. The mixture was then left overnight in the fridge. The precipitate (metachlorobenzoic acid) was filtered off and the solution washed with 20% aqueous NaOH (2×50 ml), water, dried ($MgSO_4$) and the solvent removed. The crude sulphone (80% yield) was recrystalled in petroleum ether, mp 31°–32° C. $^1$H-nmr ($CDCl_3$) shows S 6.2 ppm (s, 2H); 2.4 (t, 4H); 0.7–2.0 (m, 26H).

(c) 3-6-Diheptylphthalonitrile

In a typical experiment 2,5-diheptylthiophene 1,1-dioxide (2 g, 6.4×10 mole) and fumaronitrile (0.5 g, 6.4×10 mole) in chloroform (5 ml) were heated in a sealed tube to 180° for 18 H. The contents of the tube were evaporated to dryness and chromatographed over silica (toluene as eluent) to afford 3,6-diheptylphthalonitrile (0.98 g, 47%) as a yellow solid. The material was recrystallised from ethanol to afford a colourless solid, mp 44°–46° C. $^1$H-nmr ($CDCl_3$) shows S 7.52 (s, 2H); 2.85 (t, 4H); 1.0–1.9 (m, 20H); 0.90 (t, 6H).

EXAMPLE 3

Preparation of 1,4-di(3-pentoxycarbonylpropyl)-8,11,15, 18,22,25-hexadecylphthalocyanine according to the route shown in FIG. 2.

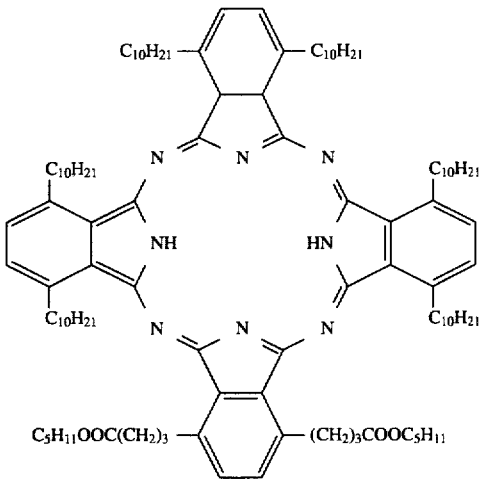

Figure 3:
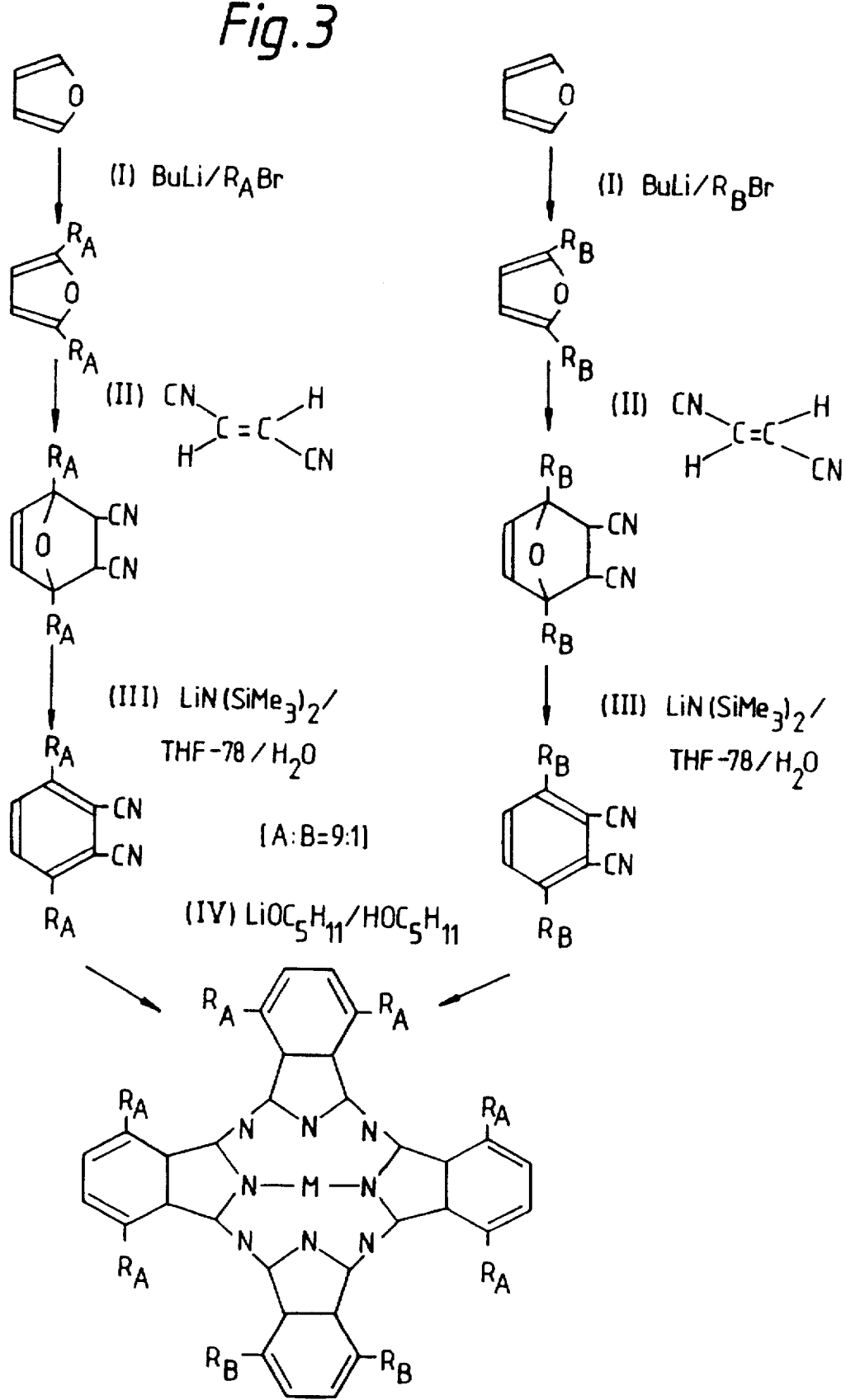
FIG. 3 illustrates a method for producing mixed group sustituent phthalocyanines.

3,6-didecylphthalonitrile (3.2 g, 7.8 mmol) prepared by the general route shown in FIG. 1 and 3,6-di(4,4,4-trimethoxybutyl) phthalonitrile (0.35 g, 0.9 mmol) were dissolved in pentanol (30 ml) and lithium (0.6 g) was added in small portions. On heating, the solution turned a dark green colour. The reaction mixture was refluxed for 1 hour. After cooling, acetic acid (30 ml) was added and after a short while the solvent was removed, from the resultant slurry, under reduced pressure. The required phthalocyanines could be separated by their elution through a silica column using a solvent system of toluene - ethyl acetate (9:1). They were recrystallised from a mixture of THF/acetone (1:2) to yield metal-free 1,4,8,11,15,18,22, 25-octadecylphthalocyanine (150 mg, 5%), no simple melting point. (Found C,82.2; H,11.2; N,6.9 $C_{112}H_{178}N_8$ requires C,82.17; H,10.98; N,6.85), max (nujol) 3300(NH), 1605, 1577 cm$^{-1}$ (CC aromatic); (60 MHz; $CDCl_3$) 0.9(t,24), 1.05–2.48(br s,138H), 4.43(t,16H), 7.79(s,8H), and 1,4-di(3-pentoxycarbonylpropyl)- 8,11,15,18,22,25-hexadecylphalcyanine (18 mg, 0.5%), (found C79.5; H,10.5; N,607 $C_{110}N_8O_4$ requires C,79.16; H,10.29; N,6.72), max (nujol)3300(NH), 1735(CO), 1605,1577 cm$^{-1}$ (CC aromatic); $_M$(60 MHz; $CDCl_3$) 0.85(t,24H), 1.05–1.80(br S, 96H), 1.80–2.34(br s, 16H), 2.48(br s, 8H), 3.92(t,4H), 4.44(t,16H), 7.85(S,8H).

EXAMPLE 4

Preparation of 1,4-di(3-carboxylproply)-8,11,15,18,22, 25-hexaalkylphthalocyanines A solution of 1,4-di(3-pentoxycarboxypropyl)-8,11,15, 18,22,25-hexadecylphthalocyanine 25 mg, 0.02 mmd) prepared as in example 2 above and dissolved in THF (20 ml) was placed in contact with an aqueous solution of sodium hydroxide (20 ml of a 4 molar solution). Tetratbutyl ammonium bromide (2 mg) was added and the two phase system refuxed for 6h. On cooling, diethyl ether (30 ml) was added to the organic layer which was then washed with dilute hydrochloric acid and then thoroughly with water. The ether layer was dried ($M_g$ $SO_4$) and the solvent removed under reduced pressure. The crude product was recrystallised from a THF/acentone mix to afford pure 1,4-di(3-carboxypropyl)-8,11,15,18, 22,25-hexadecylphthalocyanine, (18 mg, 79%); (Found C,78.7; H,8.95; N,7.2 $C_{100}H_{150}N_8O_4$ requires C,78.58; H,9,91; N,7.23.); (thin film) 3500–2500(OH), 330(NH), 1720(CO), 1605,1577 cm (CC aromatic).

EXAMPLE 5

Preparation of Metal-Free 1,4,8,11,15,18,22,25-octa-ethoxyphthalocyanine

Lithium metal (0.75 g) was added to refluxing solution of 1,4-diethoxyphthalonitrile (1.6 g, $4.6 \times 10^{-3}$ mol) in pentanol (10 mol) under a nitrogen atmosphere. The reaction solution was maintained at reflux for 0.75 h, cooled and stirred into glacial acetic acid (100 ml). After 0.25 h the bulk of the solvent was removed and the green residue dissolved in dichloromethane (50 ml). The solution was washed with 10% hydrochloric acid (100 ml) and brine (100 ml). The organic phase was separated, dried ($MgSO_4$) and the solvent evaporated. The residue was chromatographed (silica gel, $CH_2Cl_2$ and ether as eluents) and the green fraction recrystallised from a slowly evaporating solution in $CH_2Cl_2$/pyridine (95:5) to yield metal-free 1,4,8,11,15,18,22,25-octaethoxphthalocyanine (0.2 g, 20%) mp >300° C.

Further information on the product (7b) and those of other alkoxy phthalocyanines prepared using the methods exemplified herein can be found in Tables 3,4,5,6 and 7.

EXAMPLE 6

Preparation of copper 1,4,8,11,15,18,22,25-octa-propyloxyphthalocyanine

Copper (II) acetate monohydrate (0.75 g, $3.7 \times 10^{-3}$ mol) was added to a reflexing solution of metal-free 1,4,8,11,15,18,22,25-octa-propyloxyphthalocyanine, (0.1 g, $1.02 \times 10^{-4}$ mol) in 1-butanol (5 ml). The solution was maintained at reflux for 0.5 h, cooled and chromatographed (silica gel, $CH_2Cl_2$ and ether as eluents). The green blue fraction to elute first was crystallised from a slowly evaporating solution in $CH_2Cl_2$/pyridine to afford the copper analogue (0.086 g, 81%) mp >300°.

TABLE 2

Preparation of some 1,4-dialkoxy-2,3-dicyanobenzenes (11) from the dicyanohydroquinones (12).

| Compound No. | SM[a] | Alkylating Agent[b] | Time (h) | Yield (%) | mp (°C.) | Molecular Formula | Found C | Found H | Found N | Requires C | Requires H | Requires N |
|---|---|---|---|---|---|---|---|---|---|---|---|---|
| 11b | 12 | EtI | 60 | 48 | 203 | $C_{12}H_{12}N_2O_2$ | 66.5 | 5.6 | 12.9 | 66.65 | 5.6 | 12.95 |
| 11c | 12 | PrI | 48 | 40 | 198 | $C_{14}H_{16}N_2O_2$ | 68.7 | 6.7 | 11.5 | 68.8 | 6.6 | 11.5 |
| 11d | 12 | BuI | 60 | 50 | 193 | $C_{16}H_{20}N_2O_2$ | 70.4 | 7.5 | 10.2 | 70.55 | 7.4 | 10.3 |
| 11e | 12 | peI | 60 | 58 | 172 | $C_{18}H_{24}N_2O_2$ | 72.2 | 7.95 | 9.3 | 72.0 | 8.05 | 9.3 |
| 11f | 12 | HexI | 60 | 48 | 164 | $C_{20}H_{28}N_2O_2$ | 73.3 | 8.45 | 8.5 | 73.1 | 8.6 | 8.5 |
| 11g | 12 | HepI | 60 | 52 | 153 | $C_{22}H_{32}N_2O_2$ | 73.9 | 9.0 | 7.7 | 74.1 | 9.05 | 7.85 |
| 11i | 12 | NonI | 60 | 47 | 151 | $C_{26}H_{40}N_2O_2$ | 76.0 | 10.1 | 6.3 | 76.3 | 10.05 | 6.4 |
| 11k | 12 | DodecI | 65 | 47 | 137 | $C_{32}H_{52}N_2O_2$ | 77.5 | 10.75 | 5.7 | 77.4 | 10.5 | 5.65 |
| 11l | 12 | $CH_2$—$CH(CH_2)_3$I | 65 | 42 | 178 | $C_{18}H_{20}N_2O_2$ | 72.8 | 6.9 | 9.45 | 72.95 | 6.8 | 9.45 |
| 11m | 12 | $Ph(CH_2)_3$I | 60 | 35 | 170 | $C_{26}H_{24}N_2O_2$ | 78.65 | 5.9 | 7.0 | 78.75 | 6.1 | 7.1 |

[a]Starting material
[b]Straight-chain alkyl groups are used throughout

TABLE 3

Preparation of some $(RO)_8H_2Pc$'s (7)

| Compound | | ROH/ROLi | Time | Temp | Yield | Mp | Molecular | Found | | | Requires | | |
|---|---|---|---|---|---|---|---|---|---|---|---|---|---|
| No. | RO[b] | SM[a] | (ROH)[b] | (h) | (°C.) | % | (°C.) | Formula | C | H | N | C | H | N |
| 7b | EtO | 11b | PeOH | 0.75 | Reflux | 20 | >250 | $C_{48}H_{50}N_8O_8$ | 67.0 | 6.1 | 12.5 | 66.6 | 5.8 | 12.9 |
| 7c | PrO | 11c | PeOH | 0.75 | Reflux | 23 | >250 | $C_{56}H_{66}N_8O_8$ | 68.8 | 6.6 | 11.4 | 68.7 | 6.8 | 11.4 |
| 7d | BuO | 11d | BuOH | 1 | Reflux | 21 | 136.5–138.5 | $C_{64}H_{82}N_8O_8$ | 70.4 | 7.7 | 10.0 | 70.4 | 7.6 | 10.2 |
| 7e | PeO | 11e | PeOH | 0.75 | Reflux | 28 | 116–117.5 | $C_{72}H_{98}N_8O_8$ | 71.8 | 8.1 | 9.3 | 71.8 | 8.2 | 9.3 |
| 7f | HexO | 11f | PeOH | 0.75 | Reflux | 32 | 85–86.5 | $C_{80}H_{114}N_8O_8$ | 72.65 | 8.7 | 8.7 | 73.0 | 8.7 | 8.5 |
| 7g | HepO | 11g | PeOH | 0.75 | Reflux | 33 | 76.5–77.5 | $C_{88}H_{130}N_8O_8$ | 73.9 | 9.2 | 8.0 | 74.0 | 9.2 | 7.85 |
| 7h | OctO | 11h | PeOH | 0.75 | Reflux | 37 | 66–77 | $C_{96}H_{146}N_8O_8$ | 74.5 | 9.7 | 7.4 | 74.85 | 9.55 | 7.3 |
| 7i | NonO | 11i | PeOH | 0.75 | Reflux | 37 | 49–50.5 | $C_{104}H_{162}N_8O_8$ | 75.2 | 9.75 | 7.0 | 75.6 | 9.8 | 6.8 |
| 7j | DecO | 11j | PeOH | 0.75 | Reflux | 38 | 51–53 | $C_{112}H_{178}N_8O_6$ | 75.95 | 10.4 | 6.45 | 76.2 | 10.1 | 6.35 |
| 7k | DodecO | 11k | PeOH | 0.75 | Reflux | 40 | 53–54 | $C_{128}H_{210}N_8O_8$ | 77.0 | 10.8 | 5.85 | 77.3 | 10.6 | 5.6 |
| 7l | Pent-4-enylO | 11l | PeOH | 0.75 | Reflux | 35 | 117.5–119.5 | $C_{72}H_8N_8$ | 72.5 | 7.2 | 9.5 | 72.8 | 7.0 | 9.4 |
| 7m | Ph(CH$_2$)$_3$O | 11m | PeOH | 0.75 | Reflux | 23 | >300 | $C_{104}H_{98}N_8O_8$ | 78.3 | 6.0 | 6.7 | 78.65 | 6.2 | 7.05 |

SM = starting material [b]R = straight chain

TABLE 4

Preparations of metal derivatives of some alkoxy substituted phthalocyanines by reacting the metal-free derivative with the appropriate metal acetate.

| Compound | | | | Time | Temp | Yield | Mp | Molecular | Requires | | | Requires | | |
|---|---|---|---|---|---|---|---|---|---|---|---|---|---|---|
| No. | RO | Metal | Solvent | (h) | (°C.) | % | (°C.) | Formula | C | H | N | C | H | N |
| 8a | PrO | Cu | BuOH | 0.5 | Reflux | 81 | >300 | $C_{56}H_{64}N_8O_8Cu$ | 64.6 | 6.2 | 10.7 | 64.6 | 6.2 | 10.8 |
| 8b | BuO | Cu | BuOH | 0.5 | Reflux | 77 | 200–201 | $C_{64}H_{80}N_8O_8Cu$ | 67.1 | 7.3 | 9.4 | 66.7 | 7.0 | 9.7 |
| 8c | PeO | Cu | PeOH | 0.5 | Reflux | 85 | 173.5–174.5 | $C_{72}H_{96}N_8O_8Cu$ | 68.4 | 7.6 | 8.8 | 68.35 | 7.65 | 8.9 |
| 8d | OctO | Cu | PeOH | 0.5 | Reflux | 81 | 69 | $C_{96}H_{144}N_8O_8Cu$ | 71.7 | 9.1 | 7.1 | 72.0 | 9.1 | 7.0 |
| 8e | DodecO | Cu | PeOH | 0.5 | Reflux | 79 | 52–53.5 | $C_{128}H_{208}N_8O_8Cu$ | 74.85 | 10.4 | 5.4 | 75.0 | 10.2 | 5.5 |
| 8f | Pent-4-enylO | Cu | PeOH | 0.5 | Reflux | 78 | 171.5–173 | $C_{72}H_{80}N_8O_8Cu$ | 69.0 | 6.8 | 8.9 | 69.2 | 6.45 | 9.0 |
| 9 | PeO | Zn | PeOH | 0.5 | Reflux | 71 | 139–141 | $C_{72}H_{96}N_8O_8Zn$ | 68.5 | 7.4 | 9.0 | 68.25 | 7.6 | 8.8 |
| 10 | PeO | Ni | PeOH | 0.5 | Reflux | 68 | 198–200 | $C_{72}H_{96}N_8O_8Ni$ | 68.65 | 7.6 | 8.7 | 68.6 | 7.7 | 8.9 |

TABLE 5

Q-Band Absorption Data for some $(RO)_8$ Pcs

| | | | $\lambda_{max}$/nm. ($\hat{\tau} \times 10^{-5}$) | | cm$^{-1}$ | | |
|---|---|---|---|---|---|---|---|
| No. | Abbreviation | Solvent | $Q_x$ | $Q_y$ | $Q_x$ | $Q_y$ | $\Delta$/cm$^{-1}$[a] |
| 7b | (EtO)$_8$H$_2$Pc | Tolune | 734 (1.16) | 758 (1.38) | 13620 | 13190 | 430 |
| | | CHCl$_3$ | 748 (1.28) | 772 (1.42) | | | |
| 7c | (PrO)$_8$H$_2$Pc | Toluene | 737 (1.17) | 760 (1.35) | 13570 | 13160 | 410 |
| 7d | (BuO)$_8$H$_2$Pc | Toluene | 738 (1.13) | 761 (1.34) | 13550 | 13140 | 410 |
| 7e | (PeO)$_8$H$_2$Pc | Tolune | 738 (1.20) | 762 (1.39= | 13550 | 13120 | 430 |
| | | CHCl$_2$ | 768 (1.25) | | | | |
| 7j | (OctO)$_8$H$_2$Pc | Toluene | 740 (1.22) | 762 (1.42) | 13510 | 13120 | 390 |
| | | CG$_2$Cl$_2$ | 767 (1.38) | | | | |
| 7j | (CodecO)$_8$H$_2$Pc | CH$_2$Cl$_2$ | 768 (1.45) | | | | |
| 8d | (OctO)$_8$CuPc | CH$_2$Cl$_2$ | 752 (1.91) | | | | |
| 9 | (PeO)$_8$ZnPc | CH$_{2Cl_2}$ | 748 (1.32) | | | | |
| 10 | (PeO)$_8$NiPc | Toluene | 734 (1.66) | | | | |
| | | CH$_2$Cl$_2$ | 742 (1.69) | | | | |

[a]Rhombic splitting ($Q_x$–$Q_y$)

TABLE 6

Solubility of materials in nematic liquid crystal E7 at 20° C.

| Compound | | | |
|---|---|---|---|
| No. | Abbreviation | Solubility % w/w | $\lambda_{max}$ nm |
| 7e | (PeO)$_8$H$_2$Pc | 1.3 | 770 |

TABLE 6-continued

Solubility of materials in nematic liquid crystal E7 at 20° C.

| Compound | | | |
|---|---|---|---|
| No. | Abbreviation | Solubility % w/w | $\lambda_{max}$ nm |
| 7h | (OctO)$_8$H$_2$Pc | 2.5 | 771 |

TABLE 6-continued

Solubility of materials in nematic liquid crystal E7 at 20° C.

| Compound | | | |
|---|---|---|---|
| No. | Abbreviation | Solubility % w/w | $\lambda_{max}$ nm |
| 7k | $(DodecO)_8H_2Pc$ | 1.7 | 771 |
| 8d | $(OctO)_8CuPc$ | 1.5 | 759 |
| 9 | $(PeO)_8ZnPc$ | 1.1 | 751 |
| 10 | $(PeO)_8NiPc$ | 1.8 | 748 |

TABLE 7

Variation in the bi-layer spacing as a function of temperature determined for LB films of some 1,4,8,11,15,18-hexa-alkyl-22,25-bis (carboxypropyl) phthalocyanines using low angle x-ray diffraction.

| Alkyl subt | Central atom(s) | Bi-layer spacing (temperature) A (°C.) |
|---|---|---|
| n-octyl | H2 | 41 (RT); 36 (at RT after heating to 140) |
| n-nonyl | Cu | 40.8 (RT); 41.6 (125); 38.5 (155) |
| n-decyl | $H_2$ | 40.0 (RT); 40.0 (150); 39.2 (cooled to RT) |

Polarised absorption spectra of LB films of the n-octyl Pc of table 8 are shown in FIG. 11(a) with the electric field vector (E) perpendicular to the dipping direction, and 11(b) parallel to the dipping direction. FIG. 12 shows polarised absorption spectra of the n-nonyl PC of table 8, with E parallel to the dipping direction. FIGS. 13 & 14 show absorption spectra with E parallel to the dipping direction for the decyl Pc of table 8, and the effect of heating cooling cycles upon these films. The changes in the absorption curve caused by these cycles indicate the possibility of using such a film as an optical storage medium.

7. Conclusions

The above examples demonstrate the preparation of a number of Pc of the invention, together with their properties, including discotic liquid crystal character.

Properties of Pc in various solvents, including liquid crystal materials (E7) are also demonstrated.

The ability of Pc of the invention to form useful LB films is also shown and the properties of such films are investigated.

We claim:

1. A phthalocyanine of the formula:

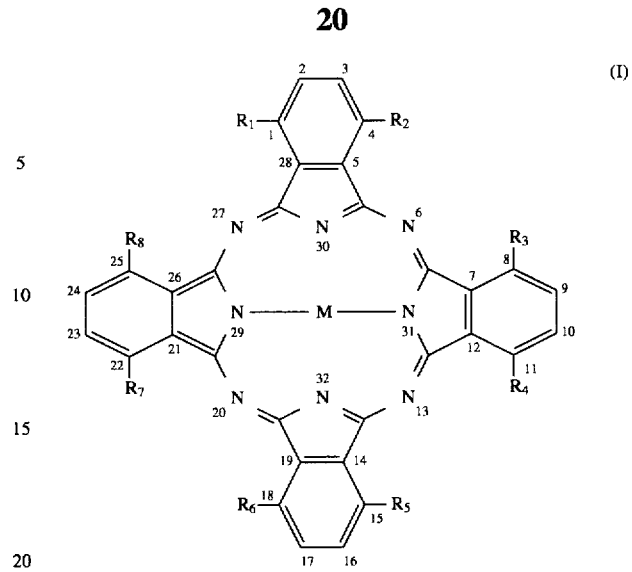

(I)

where M is a metal atom or is 2H, one H being bonded to each of the two bonding nitrogen atoms at positions 29 and 31 as shown; $R_1$ to $R_8$ are the same or different and are independently selected from $C_1$–$C_{10}$ alkenyl, X—O—Y, X-phenyl, $X^2COOX^1$ and $X^2 CONR^1R^{11}$, where X and $X^2$ are independently selected from a chemical bond, —$(CH_2)_n$— where n is an integer from 1 to 20, and $(CH_2)_aCH{=}CH(CH_2)_b$ where a and b are independently selected from integers from 0 to 20 and a+ b is from 0 to 20; $X^1$ is independently selected from $C_1$–$C_{20}$ alkyl, $C_2$–$C_{20}$ alkenyl and H, $R^1$ and $R^{11}$ are independently selected from H, $C_1$–$C_{20}$ alkyl and $C_2$–$C_{20}$ alkenyl, and Y is independently selected from the $C_1$–$C_{20}$ alkyl, $C_2$–$C_{20}$ alkenyl, —$(CH_2)_n$-phenyl where n is integer from 0 to 20 and H provided that not all of the groups $R_1$ to $R_8$ are simultaneously X—O—Y where X is a chemical bond and Y is alkyl.

2. A phthalocyanine as claimed in claim 1 having the formula:

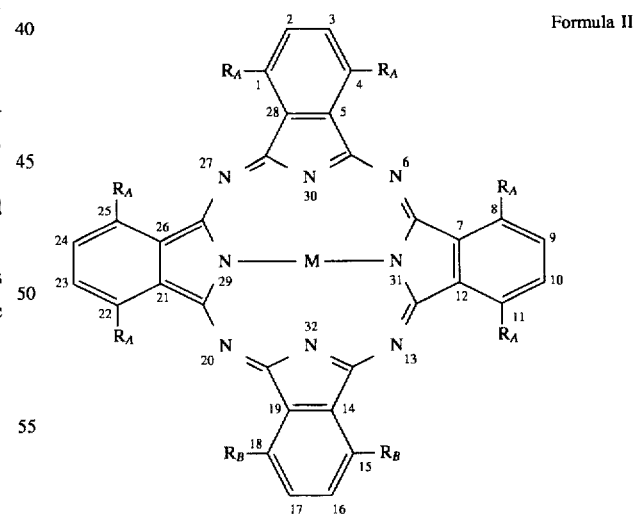

Formula II where $R_A=R_B$=alkyl or $R_A$=alkyl and $R_B$=—$X^2$COO-alkyl or —$X^2$CONR$^1$R$^{11}$ or $R_A=R_B$ =CH$_2$O-alkyl or $R_A=R_B$—X-phenyl or $R_A=R_B$=—$X^2$CONR$^1$R$^{11}$ or $R_A=R_B$=alkenyl where $X^2$,R$^1$, R$^{11}$ X and M are as defined in claim 1.

3. A phthalocyanine as claimed in claim 1, wherein $R_A$ and $R_B$ are alkyl.

4. A phthalocyanine as claimed in claim 3, wherein $R_A$ and $R_B$ are n-alkyl containing 4 to 12 carbon atoms.

5. A phthalocyanine as claimed in claim 3, wherein $R_A$ is alkyl, $R_B$ is —(CH)$_{2n}$—COOR$^1$ where n is 1 to 10 and R$^1$ is an alkyl group containing 1 to 10 carbon atoms.

6. A phthalocyanine as claimed in claim 5, n is 3 and R$^1$ is n-alkyl group.

7. A phthalocyanine as claimed in claim 6, wherein $R_A$ and $R_B$ are —CH$_2$-O-alkyl groups, where the alkyl groups contain 3 to 12 carbon atoms.

8. A phthalocyanine as claimed in claim 5, wherein the alkyl groups are n-alkyl.

9. A phthalocyanine as claimed in claim 2, wherein $R_A$ and $R_B$ are alkenyl groups of the formula —(CH$_2$)$_n$—CH=CH—Z, where n is 0 to 10 and Z is H or alkyl, the whole alkenyl group containing 2 to 20 carbon atoms.

10. A phthalocyanine as claimed in claim 9, wherein $R_A$ and $R_B$ are (CH$_2$)$_n$—CH=CH$_2$.

11. A phthalocyanine as claimed in claim 10, wherein $R_A$ and $R_B$ is alkyl and $R_B$ is —$X^2$COO-alkyl, $X^2$COOH, $X^2$CONR$^1$R$^{11}$.

12. A phthalocyanine as claimed in claim 11, wherein $R_B$ is $X^2$COOH with $X^2$ being a chemical bond or —(CH$_2$)$_a$— where a is 1 to 6 and $R_A$ is C$_8$-C$_{10}$ alkyl.

13. A phthalocyanine as claimed in claim any one of claims 2, 3, 4, 5, 6, 7, 8, 9, 10, 11 or 12, wherein M is 2H.

14. A phthalocyanine as claimed in any one of claims 2, 3, 4, 5, 6, 7, 8, 9, 10, 11 or 12 wherein M is copper or a copper compound.

15. A phthalocyanine according to claim 2, wherein $R_A$ and $R_B$ are alkenyl groups of the formula —(CH$_2$)$_n$CH=CHX$^1$ where n is 0 to 10 and X$^1$ is H or alkyl, the whole alkenyl group containing 2 to 20 carbon atoms.

16. A phthalocyanine according to claim 2, wherein $R_A$ is alkyl and $R_B$ is $X^2$COO-alkyl or $X^2$COOH.

17. A phthalocyanine according to claim 16, wherein $X^2$ is a single bond or —(CH$_2$)$_a$— where a is 1 to 6 and $R_A$ is C$_8$-C$_{10}$ alkyl.

18. An LB film wherein it contains at least one layer of a phthalocyanine as claimed in claim 1.

19. An LB film according to claim 18, wherein $R_A$ is selected from C$_8$ to C$_{10}$ n-alkyl, $R_B$ is —(CH$_2$)$_3$COOH and M is selected from Cu or 2H.

20. A liquid crystal electro-optical display device including two electrically insulating, optically transparent substrates, electrodes on the inner surfaces of the substrates, and a film of a dielectric material contained between the substrates, which material comprises a solution as claimed in claim 1.

21. A phthalocyanine of the formula:

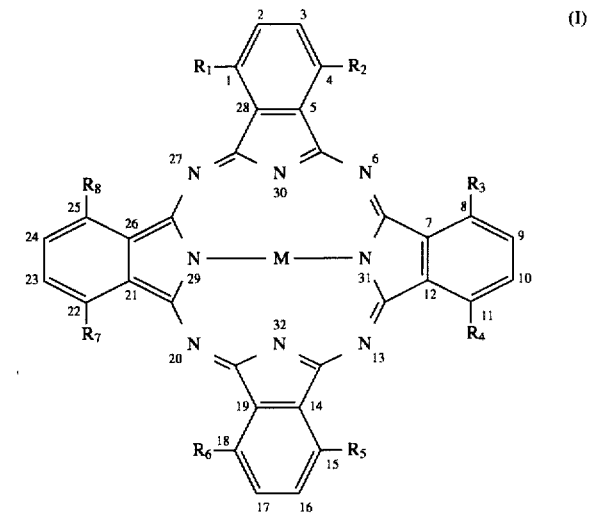

where M is a metal atom or a metal halide or oxide, or M is 2H, one H being bonded to each of the two bonding nitrogen atoms at positions 29 and 31 as shown; $R_1$ to $R_8$ are the same or different and are independently selected from $C_1$-$C_{10}$ alkyl, $C_2$-$C_{20}$ alkenyl, X—O—Y, X-phenyl, $X^2$COOX$^1$ and $X^2$ CONR$^1$R$^{11}$, where X and $X^2$ are independently selected from a chemical bond, —(CH$_2$)$_n$— where n is an integer from 1 to 20, and (CH$_2$)$_a$CH=CH(CH$_2$)$_b$ where a and b are independently selected from integers from 0 to 20 and a + b is from 0 to 20; $X^1$ is independently selected from $C_1$-$C_{20}$ alkyl, $C_2$-$C_{20}$ alkenyl and H, R$^1$ and R$^{11}$ are independently selected from H, $C_1$-$C_{20}$ alkyl and $C_2$-$C_{20}$ alkenyl, and Y is independently selected from the $C_1$-$C_{20}$ alkyl, $C_2$-$C_{20}$ alkenyl, —(CH$_2$)$_n$-phenyl where n is integer from 0 to 20 and H provided that not all of the groups $R_1$ to $R_8$ are simultaneously X—O—Y where X is a chemical bond and Y is alkyl.

22. An LB film wherein it contains at least one layer of a phthalocyanine as claimed in claim 21.

23. A liquid crystal electro-optical display device including two electrically insulating, optically transparent substrates, electrodes on the inner surfaces of the substrates, and a film of a dielectric material contained between the substrates, which material comprises a solution as claimed in claim 21.

* * * * *

UNITED STATES PATENT AND TRADEMARK OFFICE
CERTIFICATE OF CORRECTION

Page 1 of 5

PATENT NO. : 5,506,708
DATED : April 9, 1996
INVENTOR(S) : Harrison, et. al.

It is certified that error appears in the above-indentified patent and that said Letters Patent is hereby corrected as shown below:

In the Abstract, line 6, amend to read --a chemical bond, $(CH_2)_n$ where n=0-20 or $(CH_2)_a$ CH=CH--.

Figs. 1 and 3, compound (II) in all instances should read:

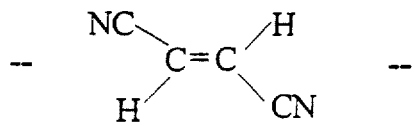

Fig. 3, at the bottom of the page replace the formula by the following:

UNITED STATES PATENT AND TRADEMARK OFFICE
CERTIFICATE OF CORRECTION

PATENT NO. : 5,506,708
DATED : April 9, 1996
INVENTOR(S) : Harrison, et. al.

Page 2 of 5

It is certified that error appears in the above-indentified patent and that said Letters Patent is hereby corrected as shown below:

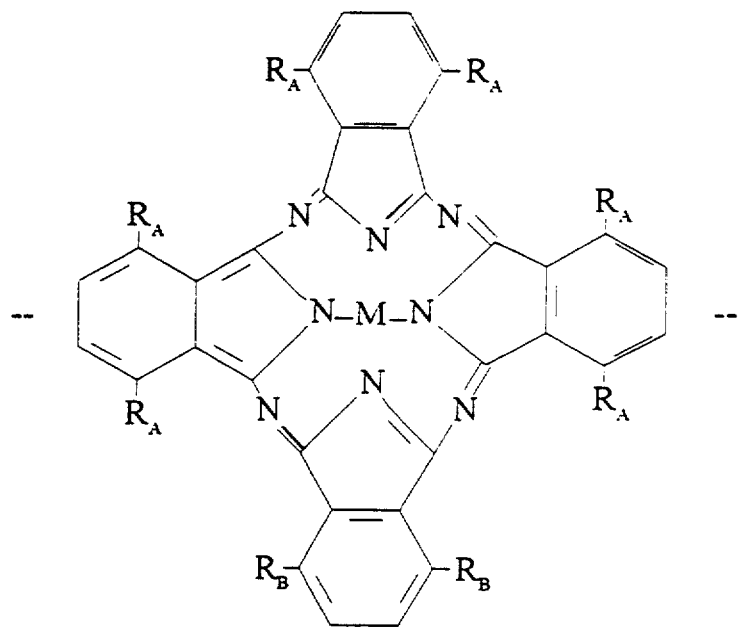

Fig. 6, compound (9), delete "M = zn" and replace by --M = Zn --.

UNITED STATES PATENT AND TRADEMARK OFFICE
CERTIFICATE OF CORRECTION

PATENT NO. : 5,506,708
DATED : April 9, 1996
INVENTOR(S) : Harrison, et. al.

It is certified that error appears in the above-indentified patent and that said Letters Patent is hereby corrected as shown below:

Column 1, lines 47 and 65, delete "insoluble" and replace by --insoluble--.

Column 2, lines 1 & 67, delete "noval" and "sterochemistry" and replace by --novel-- and --stereochemistry --, respectively.

Column 4, line 36, delete "pc" and replace by --Pc--.

Column 4, line 60, delete "mesophaeses" and replace by --mesophases--.

Column 5, line 2, delete "thermotroptc" and replace by --thermotropic--.

Column 7, lines 21 & 40, delete "insoluable" and "$CH^2$" and replace by --insoluble-- and --$CH_2$--, respectively.

Column 8, lines 7 & 48, delete "DEvices" and "Phtholocyanines" and replace by --Devices-- and --Phthalocyanines --, respectively.

Column 8, line 59, insert a space between "in" and "formulae".

Column 9, lines 37 & 52, delete "6-dihyrexybenzene" and "sustituent" and replace by --6-dihydroxybenzene-- and --substituted--, respectively.

Column 10, lines 30 & 57, delete "S7.23" and "S5.3" and replace by --$\delta$7.23-- and --$\delta$5.3--.

UNITED STATES PATENT AND TRADEMARK OFFICE
CERTIFICATE OF CORRECTION

PATENT NO. : 5,506,708
DATED : April 9, 1996
INVENTOR(S) : Harrison, et. al.

It is certified that error appears in the above-indentified patent and that said Letters Patent is hereby corrected as shown below:

Column 11, lines 2, 22 & 24, delete "fumeranitrile", "25" and 2225 cm", and replace by --fumaronitrile--, --25%-- and --2225 cm$^{-1}$ --, respectively--.

Column 11, line 25, delete "S7.45" and replace by --δ7.45--.

Column 11, line 25, delete "mO and replace by --m)--.

Column 12, lines 6, 24 & 25, delete "S, 7.8" "octahypthylphtalocyanine" and "precptated" and replace by --δ 7.8--, --octaheptylphthalocyanine-- and --precipitated--, respectively.

Column 13, lines 15, 35, 45 & 46, delete "diheptyphthalonitrile", "86.5", "recrystalled" and "S 6.2" and replace by --diheptylphthalonitrile--, δ 6.5--, --recrystallized-- & --δ 6.2--, respectively Column 14, line 49, delete "hexadecylphalcyanine" and replace by --hexadecylphthalocyanine --.

Column 14, lines 58 & 68, delete "carboxyproply" and "Tetra-butyl" and replace by --carboxypropyl-- and --Tetra-t-butyl--, respectively.

Column 15, lines 15, 27 & 37, delete "1,4", "octaethoxphthlocyanine" and "reflexing" and replace by --3,6--, --octaethoxyphthalocyanine--, and --refluxing--, respectively.

UNITED STATES PATENT AND TRADEMARK OFFICE
CERTIFICATE OF CORRECTION

PATENT NO. : 5,506,708
DATED : April 9, 1996
INVENTOR(S) : Harrison, et. al.

It is certified that error appears in the above-indentified patent and that said Letters Patent is hereby corrected as shown below:

Column 19, line 32, delete "PC" and replace by --Pc--.

Column 20, line 24, delete "$C_{1-10}$" and replace by --$C_{1-20}$ alkyl, $C_{2-20}$ --.

Column 22, line 31, delete "$C_{1-10}$" and replace by --$C_{1-20}$--.

Claim 5, line 2, delete "$(CH)_{2n}$" and replace by --$(CH_2)_n$--.

Signed and Sealed this

Tenth Day of December, 1996

Attest:

BRUCE LEHMAN

Attesting Officer     Commissioner of Patents and Trademarks